(12) United States Patent
Hayakawa et al.

(10) Patent No.: US 6,249,391 B1
(45) Date of Patent: Jun. 19, 2001

(54) IMAGE-FORMING OPTICAL SYSTEM

(75) Inventors: Kazuhito Hayakawa, Hachioji; Yuji Kamo, Hino, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/426,192

(22) Filed: Oct. 25, 1999

(30) Foreign Application Priority Data

Mar. 11, 1999 (JP) .................................... 11-065009

(51) Int. Cl.[7] .............................. G02B 3/02; G02B 5/04
(52) U.S. Cl. ................................. 359/834; 359/720
(58) Field of Search .................................. 359/831, 834, 359/637, 837, 720

(56) References Cited

U.S. PATENT DOCUMENTS 5,936,773 * 8/1999 Togino ................................. 359/631
5,986,812 * 11/1999 Takahashi ........................... 359/631

FOREIGN PATENT DOCUMENTS 8-313829   11/1996  (JP) .
9-33855    2/1997   (JP) .
9-73043    3/1997   (JP) .

* cited by examiner

Primary Examiner—Cassandra Spyrou
Assistant Examiner—Jared Treas
(74) Attorney, Agent, or Firm—Pillsbury Winthrop LLP

(57) ABSTRACT

An image-forming optical system including a compact and high-performance prism optical system. The image-forming optical system has a prism member formed from a medium having a refractive index larger than 1. The prism member has a first transmitting surface, first to third reflecting surfaces, and a second transmitting surface. The second and third reflecting surfaces are arranged so that the path of the axial principal ray in the prism is folded in a triangular shape, and the axial principal ray incident on the second reflecting surface and the axial principal ray reflected from the third reflecting surface form intersecting optical paths. At least one of the first to third reflecting surfaces has a curved surface configuration that gives a power to a light beam. The curved surface configuration has a rotationally asymmetric surface configuration that corrects aberrations due to decentration.

27 Claims, 14 Drawing Sheets

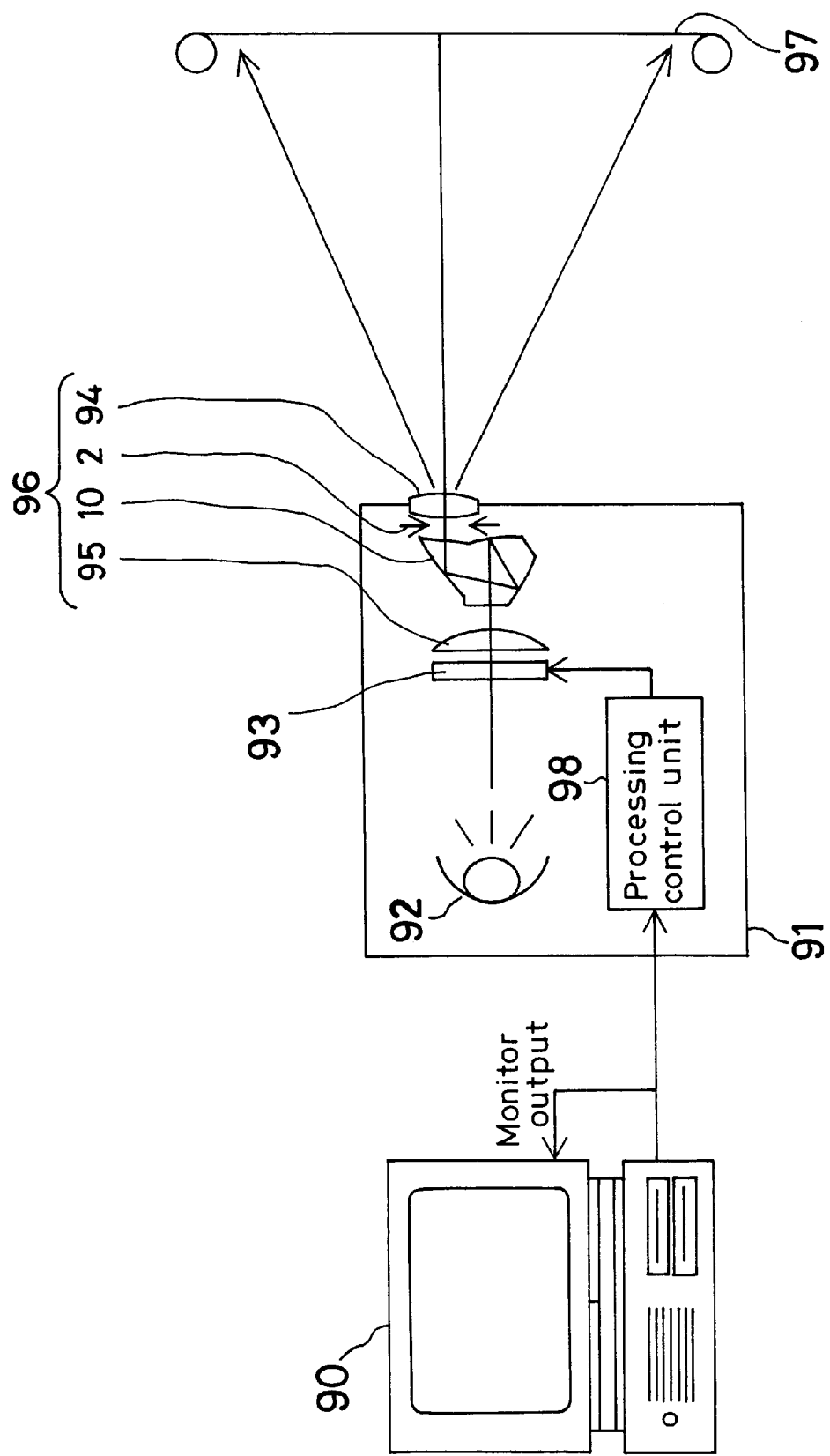

IMAGE-FORMING OPTICAL SYSTEM

BACKGROUND OF THE INVENTION

1. Field of the Invention

The present invention relates to image-forming optical systems using a reflecting surface that is decentered and has a power, for example, an image-forming optical system for use in cameras, video cameras, etc., and an image-forming optical system used in finder optical systems and so forth.

2. Discussion of Related Art

Recently, there have been proposed optical systems designed to be compact in size by giving a power to a reflecting surface and folding an optical path in the direction of the optical axis. In such optical systems, a prism or a mirror is mainly used as a member having a reflecting surface with a power. An optical system having a prism and an optical system having a mirror are largely different in characteristics from each other although these optical systems are the same in terms of the structure using a reflecting surface.

When a curvature (radius r of curvature) is given to a reflecting surface of a prism and to a reflecting surface of a mirror, the power of each of the reflecting surfaces is given by the paraxial power calculating equation as follows. The power of the reflecting surface of the prism is $-2n/r$ in a case where the prism is filled therein with a medium having a refractive index n larger than 1, whereas the power of the reflecting surface of the mirror is $-2/r$. Thus, even when these reflecting surfaces have the same curvature, the powers are different from each other. Accordingly, the curvature required for the prism is $1/n$ of the curvature required for the mirror to obtain the same power. Therefore, the prism produces a smaller amount of aberration at the reflecting surface than in the case of the mirror. Thus, the prism is more favorable than the mirror in terms of performance. Moreover, the prism has two refracting surfaces, i.e. an entrance refracting surface and an exit refracting surface, in addition to a reflecting surface as a single member. Therefore, the prism is advantageous from the viewpoint of aberration correction in comparison to the mirror, which has only a reflecting surface as a single member. Furthermore, because the prism is filled with a medium having a refractive index larger than 1, it is possible to obtain a longer optical path length than in the case of the mirror, which is placed in the air. Accordingly, it is relatively easy with the prism to provide the required reflecting surface even when the focal length is short. In general, reflecting surfaces require a high degree of accuracy for assembly because decentration errors of reflecting surfaces cause the performance to be degraded to a considerable extent in comparison to refracting surfaces. In a case where an optical system is constructed by arranging a plurality of reflecting surfaces, the prism is more advantageous than the mirror because the prism enables a plurality of reflecting surfaces to be integrated into one unit so as to fix the relative positions and is therefore capable of preventing performance degradation due to assembling. Thus, the prism is superior to the mirror in many respects.

Meanwhile, when a surface with a power is placed at a tilt to the optical axis, rotationally asymmetric aberrations are produced. For example, if a rotationally asymmetric distortion occurs, a square object may become trapezoidal undesirably. Such rotationally asymmetric aberrations (hereinafter referred to as "decentration aberrations") are impossible to correct by a rotationally symmetric surface in theory. For this reason, rotationally asymmetric curved surfaces, e.g. anamorphic surfaces, are used in conventional prism optical systems.

Such prism optical systems include the disclosure of Japanese Patent Application Unexamined Publication (KOKAI) Number [hereinafter referred to as "JP(A)"] 8-313829. JP(A) 8-313829 discloses an ocular optical system comprising a prism in which there are two reflections, and a first transmitting surface and a second reflecting surface, as counted from the pupil side, are formed from the identical surface. In this optical system, all reflecting surfaces are rotationally asymmetric anamorphic surfaces.

Among the conventional prism optical systems using rotationally asymmetric curved surfaces, prism optical systems in which there are three reflections, in particular, are disclosed in JP(A) 9-33855, 9-73043 and 9-197336. These optical systems use spherical or anamorphic surfaces as reflecting surfaces.

JP(A) 9-33855 discloses an ocular optical system in which an optical axis thereof forms an optical path that makes one turn in the prism. A third reflecting surface and a first transmitting surface, as counted from the pupil side, are formed from the identical surface, and a first reflecting surface and a second transmitting surface, as counted from the pupil side, are formed from the identical surface. The prism optical system has only one reflecting surface that is independent of other transmitting and reflecting surfaces, i.e. the second reflecting surface. The direction in which light exits from the prism optical system is about 45 degrees oblique to the direction in which light enters the prism optical system.

JP(A) 9-73043 discloses an ocular optical system in which an optical axis thereof forms an M-shaped optical path. In Example 5 of JP(A) 9-73043, for instance, a second reflecting surface and a second transmitting surface, as counted from the pupil side, are formed from the identical surface. The prism optical system has only two surfaces that are independent of other transmitting and reflecting surfaces, i.e. a first reflecting surface and a third reflecting surface. In this example, the direction in which light exits from the prism optical system is opposite to the direction in which light enters the optical system. In JP(A) 9-197336, which has an arrangement similar to the above, a second reflecting surface, as counted from the pupil side, is formed from the identical surface with a first transmitting surface and a second transmitting surface.

These prior art prism optical systems suffer, however, from various problems as stated below.

In JP(A) 8-313829, the reflecting surfaces of the prism are given a power. However, because the prism optical system has only two reflecting surfaces, there is a limit in achieving a compact optical system while ensuring the required performance. If the aperture becomes large or the field angle becomes large, the optical system may fail to fulfill the required performance.

Accordingly, it is conceivable to increase the number of reflections so that aberration correction can be made even more effectively. However, a reduction in size and an increase in performance cannot simultaneously be attained in all the prior art prism optical systems in which there are three reflections, that is, the number of reflections is larger than that in the above-described prior art prism optical systems by one.

In JP(A) 9-33855, the optical path is arranged to turn in the prism. Therefore, a reduction in size of the prism can be attained effectively by folding the optical path. However, as the light beam becomes large, it is difficult to form two transmitting surfaces and three reflecting surfaces by using independent surfaces, respectively, owing to the structure thereof. Therefore, it is inevitably necessary to form the first transmitting surface and the third reflecting surface from the identical surface and to form the second transmitting surface and the first reflecting surface from the identical surface. Consequently, the angle of reflection at each of the first and third reflecting surfaces needs to satisfy the condition for total reflection. Therefore, aberration correction cannot satisfactorily be effected. In addition, because the angle of reflection is limited at two of the three reflecting surfaces, there is almost no freedom for the exit direction with respect to the entrance direction. Therefore, considering placement of another member, there are cases where it is impossible to achieve a reduction in size of the prism optical system.

In JP(A) 9-73043 and 9-197336, the prism optical system has an M-shaped optical path. Therefore, the second reflecting surface is likely to overlap the effective portion of a light beam passing through either or both of the first and second transmitting surfaces. Accordingly, the second reflecting surface unavoidably needs to be formed with the identical surface with the first and second transmitting surfaces. For this reason, the angle of reflection at the second reflecting surface needs to be equal to or larger than the angle for total reflection. Consequently, satisfactory aberration correction cannot be effected. In addition, because the exit direction is nearly parallel to the entrance direction, if the back focus is increased, or if another optical system is connected to the prism optical system, the resulting optical system becomes undesirably large in size in the entrance direction. Therefore, there are cases where it is impossible to achieve a reduction in size of the optical system.

Thus, all the prior art prism optical systems involve problems in terms of performance or size. There has heretofore been no compact and high-performance prism optical system that satisfies the demand for an improvement in performance and the demand for a reduction in size at the same time.

SUMMARY OF THE INVENTION

In view of the above-described problems of the prior art, an object of the present invention is to provide an image-forming optical system including a compact and high-performance prism optical system.

To attain the above-described object, the present invention provides an image-forming optical system having a positive refracting power as a whole for forming an object image. The image-forming optical system has a prism member formed from a medium having a refractive index (n) larger than 1 (n>1). The prism member is a single cemented or integrally molded prism having a first transmitting surface through which a light beam enters the prism, and first, second and third reflecting surfaces that reflect the light beam in the prism. The prism further has a second transmitting surface through which the light beam exits from the prism. The second reflecting surface and the third reflecting surface are arranged so that when an axial principal ray is projected onto a plane defined by the axial principal ray incident on the second reflecting surface and the axial principal ray reflected from the second reflecting surface, the path of the axial principal ray in the prism is folded in a triangular shape, and the axial principal ray incident on the second reflecting surface and the axial principal ray reflected from the third reflecting surface form intersecting optical paths. At least one of the first, second and third reflecting surfaces has a curved surface configuration that gives a power to a light beam. The curved surface configuration has a rotationally asymmetric surface configuration that corrects aberrations due to decentration.

In this case, the intersecting optical paths formed by the second and third reflecting surfaces are desirably arranged to form either a grade crossing where a plane defined by the axial principal ray incident on the third reflecting surface and the axial principal ray reflected from the third reflecting surface coincides with a plane defined by the axial principal ray incident on the second reflecting surface and the axial principal ray reflected from the second reflecting surface, or a two-level crossing where the plane defined by the axial principal ray incident on the third reflecting surface and the axial principal ray reflected from the third reflecting surface three-dimensionally intersects the plane defined by the axial principal ray incident on the second reflecting surface and the axial principal ray reflected from the second reflecting surface within the range of ±20 degrees.

Regarding the order in which the surfaces are arranged to form an optical path, the prism member may have, in order in which light passes from the object side thereof, the first transmitting surface, the first reflecting surface, the second reflecting surface, the third reflecting surface, and the second transmitting surface so as to form an optical path in the order mentioned. Alternatively, the prism member may have, in order in which light passes from the object side thereof, the first transmitting surface, the second reflecting surface, the third reflecting surface, the first reflecting surface, and the second transmitting surface so as to form an optical path in the order mentioned.

The reasons for adopting the above-described arrangement in the present invention, together with the function thereof, will be described below in order.

A refracting optical element such as a lens is provided with a power by giving a curvature to an interface surface thereof. Accordingly, when rays are refracted at the interface surface of the lens, chromatic aberration unavoidably occurs according to chromatic dispersion characteristics of the refracting optical element. Consequently, the common practice is to add another refracting optical element for the purpose of correcting the chromatic aberration.

Meanwhile, a reflecting optical element such as a mirror or a prism produces no chromatic aberration in theory even when a reflecting surface thereof is provided with a power, and need not add another optical element only for the purpose of correcting chromatic aberration. Accordingly, an optical system using a reflecting optical element allows the number of constituent optical elements to be reduced from the viewpoint of chromatic aberration correction in comparison to an optical system using a refracting optical element.

At the same time, a reflecting optical system using a reflecting optical element allows the optical system itself to be compact in size in comparison to a refracting optical system because the optical path is folded in the reflecting optical system.

Reflecting surfaces require a high degree of accuracy for assembly and adjustment because they have high sensitivity to decentration errors in comparison to refracting surfaces. However, among reflecting optical elements, prisms, in which the positional relationship between surfaces is fixed, only need to control decentration as a single unit of prism and do not need high assembly accuracy and a large number of man-hours for adjustment as are needed for other reflecting optical elements.

Furthermore, a prism has an entrance surface and an exit surface, which are refracting surfaces, and a reflecting surface. Therefore, the degree of freedom for aberration correction is high in comparison to a mirror, which has only a reflecting surface. In particular, if the prism reflecting surface is assigned the greater part of the desired power to thereby reduce the powers of the entrance and exit surfaces, which are refracting surfaces, it is possible to reduce chromatic aberration to a very small quantity in comparison to refracting optical elements such as lenses while maintaining the degree of freedom for aberration correction at a high level in comparison to mirrors. Furthermore, the inside of a prism is filled with a transparent medium having a refractive index higher than that of air. Therefore, it is possible to obtain a longer optical path length than in the case of air. Accordingly, the use of a prism makes it possible to obtain an optical system that is thinner and more compact than those formed from lenses, mirrors and so forth, which are placed in the air.

For the reasons stated above, the present invention adopts a basic arrangement in which the image-forming optical system has a positive refracting power as a whole to form an object image without forming an intermediate image. The image-forming optical system has a prism member formed from a medium having a refractive index (n) larger than 1 (n>1). The prism member is a single cemented or integrally molded prism having a first transmitting surface through which a light beam enters the prism, and first, second and third reflecting surfaces that reflect the light beam in the prism. The prism further has a second transmitting surface through which the light beam exits from the prism.

Incidentally, if a reflecting surface is tilted with respect to the optical axis, rotationally asymmetric decentration aberrations are produced, as has been stated in regard to the prior art. Therefore, it is desirable that at least one reflecting surface of the surfaces used in the present invention should be a rotationally asymmetric surface. If a rotationally asymmetric surface is used as at least one reflecting surface, it becomes possible to correct the rotationally asymmetric decentration aberrations.

Let us explain the definition of a decentered system.

First, a coordinate system used in the following description and rotationally asymmetric surfaces will be described.

When a light ray from the object center that passes through the center of the stop and reaches the center of the image plane is defined as an axial principal ray, an optical axis defined by a straight line along which the axial principal ray travels until it intersects the first surface of the optical system is defined as a Z-axis. An axis perpendicularly intersecting the Z-axis in the decentration plane of each surface constituting the prism optical system is defined as a Y-axis. An axis perpendicularly intersecting the optical axis and also perpendicularly intersecting the Y-axis is defined as an X-axis. Ray tracing is forward ray tracing in which rays are traced from the object toward the image plane.

The rotationally asymmetric surface used in the present invention should preferably be a plane-symmetry free-form surface having only one plane of symmetry.

Free-form surfaces used in the present invention are defined by the following equation (a). It should be noted that the Z-axis of the defining equation is the axis of a free-form surface.

$$Z = cr^2 / \left[ 1 + \sqrt{\{1 - (1+k)c^2 r^2\}} \right] + \sum_{j=2}^{66} C_j X^m Y^n \quad (a)$$

In Eq. (a), the first term is a spherical surface term, and the second term is a free-form surface term.

In the spherical surface term:

c: the curvature at the vertex k: a conic constant $r = \sqrt{(X^2 + Y^2)}$

The free-form surface term is given by $$\sum_{j=2}^{66} C_j X^m Y^n = C_2 X + C_3 Y + C_4 X^2 + C_5 XY + C_6 Y^2 +$$

$$C_7 X^2 + C_5 XY + C_6 Y^2 + C_7 X^3 +$$

$$C_8 X^2 Y + C_9 XY^2 + C_{10} Y^3 + C_{11} X^4 +$$

$$C_{12} X^3 Y + C_{13} X^2 Y^2 + C_{14} XY^3 +$$

$$C_{15} Y^4 + C_{16} X^5 + C_{17} X^4 Y + C_{18} X^3 Y^2 +$$

$$C_{19} X^2 Y^3 + C_{20} XY^4 + C_{21} Y^5$$

where $C_j$ (j is an integer of 2 or higher) are coefficients.

In general, the above-described free-form surface does not have planes of symmetry in both the XZ- and YZ-planes. In the present invention, however, a free-form surface having only one plane of symmetry parallel to the YZ-plane is obtained by making all terms of odd-numbered degrees with respect to X zero. For example, in the above defining equation (a), the coefficients of the terms $C_2, C_5, C_7, C_9, C_{12}, C_{14}, C_{16}, C_{18}, C_{20}, C_{23}, C_{25}, C_{27}, C_{29}, C_{31}, C_{33}, C_{35}, \ldots$ are set equal to zero. By doing so, it is possible to obtain a free-form surface having only one plane of symmetry parallel to the YZ-plane.

A free-form surface having only one plane of symmetry parallel to the XZ-plane is obtained by making all terms of odd-numbered degrees with respect to Y zero. For example, in the above defining equation (a), the coefficients of the terms $C_3, C_5, C_8, C_{10}, C_{12}, C_{14}, C_{17}, C_{19}, C_{21}, C_{23}, C_{25}, C_{27}, C_{30}, C_{32}, C_{34}, C_{36}, \ldots$ are set equal to zero. By doing so, it is possible to obtain a free-form surface having only one plane of symmetry parallel to the XZ-plane.

Furthermore, the direction of decentration is determined in correspondence to either of the directions of the above-described planes of symmetry. For example, with respect to the plane of symmetry parallel to the YZ-plane, the direction of decentration of the optical system is determined to be the Y-axis direction. With respect to the plane of symmetry parallel to the XZ-plane, the direction of decentration of the optical system is determined to be the X-axis direction. By doing so, rotationally asymmetric aberrations due to decentration can be corrected effectively, and at the same time, productivity can be improved.

It should be noted that the above defining equation (a) is shown as merely an example, and that the feature of the present invention resides in that rotationally asymmetric aberrations due to decentration are corrected and, at the same time, productivity is improved by using a rotationally asymmetric surface having only one plane of symmetry. Therefore, the same advantageous effect can be obtained for any other defining equation that expresses such a rotationally asymmetric surface.

It becomes possible to correct decentration aberrations by using such a rotationally asymmetric surface. However, if the number of aberration correcting surfaces is small, the increase in performance is limited even if rotationally asymmetric surfaces are used. Therefore, increasing the number of reflecting surfaces of the prism optical system is deemed favorable from the viewpoint of performance.

However, simply increasing the number of reflecting surfaces of the prism is not always favorable for performance. The prism generally needs to fold light rays so that the effective portions of the reflecting surfaces do not overlap each other. Therefore, when there are a surface a, a surface b, and a surface c in order in which rays pass, for example, it is necessary to increase the angle of reflection at the surface b or to increase the spacing between the surfaces a and b and the spacing between the surfaces b and c so that the effective portions of these surfaces do not overlap each other. The amount of decentration aberrations produced by a reflecting surface generally becomes larger as the angle of reflection at the surface increases. Therefore, increasing the reflection angle is unfavorable for performance. If the spacing between the reflecting surfaces is increased, it becomes necessary to increase the optical path length. Consequently, the load of ensuring the required performance becomes unfavorably heavy, and the prism also becomes unfavorably large in size.

Let us give a definition of the optical path in the present invention. When an optical path is folded by a plurality of reflecting surfaces, the optical axis is not always in the same plane, but the optical axis may take a three-dimensional optical path, which is not in the same plane. In the image-forming optical system according to the present invention also, the optical axis may take a three-dimensional optical path. In the following description, the optical path will be defined on a two-dimensional basis such that a three-dimensional optical path is included in the scope of the present invention.

The optical axis of a decentered optical system is defined by a light ray from the object center that passes through the center of the stop and reaches the center of the image plane. This ray will hereinafter be referred to as "axial principal ray". The optical path is defined by the projective axial principal ray, that is, the axial principal ray as projected onto a plane defined by the axial principal ray incident on the second reflecting surface and the axial principal ray reflected from the second reflecting surface. With this definition, a three-dimensional optical path is also included in the scope of the present invention.

Incidentally, increasing the number of reflections in a prism is favorable from the viewpoint of performance but unfavorable for the achievement of a reduction in size. Thus, the number of reflections relates to both performance and size. In the present invention, therefore, the number of reflections is set at a value with which an increase in performance and a reduction in size can be effectively attained with good balance. If the number of reflections in the image-forming optical system is two or less, the effect of correcting decentration aberrations is limited, as stated above in regard to the prior art. Therefore, reducing the number of reflections to two or less is unfavorable from the viewpoint of performance. If the number of reflections is increased to four or more, the degree of freedom in the optical path folding direction is reduced, and it becomes difficult to construct the image-forming optical system in a compact form. In addition, if the number of reflections is increased, the desired prism cannot be constructed unless common reflecting surfaces are used. Thus, increasing the number of reflections is not always favorable for performance. Moreover, if the number of reflections is increased, the effect of manufacturing errors on performance is intensified correspondingly, causing the performance to be degraded unfavorably. Accordingly, the number of reflections is set at three in the image-forming optical system according to the present invention.

That is, the prism member, which constitutes the image-forming optical system according to the present invention, is formed from a single cemented or integrally molded prism having a first transmitting surface through which a light beam enters the prism, and first, second and third reflecting surfaces that reflect the light beam in the prism. The prism further has a second transmitting surface through which the light beam exits from the prism.

Furthermore, the second reflecting surface and the third reflecting surface are placed so that the path of the axial principal ray in the prism is folded in a triangular shape, and that the axial principal ray incident on the second reflecting surface and the axial principal ray reflected from the third reflecting surface form intersecting optical paths.

In a case where the number of reflections is set at three, if the optical path is simply folded by each reflecting surface, the lengthwise or breadthwise dimension of the prism optical system becomes large, and the overall size of the optical system increases unfavorably. Consequently, it becomes difficult to achieve a compact and high-performance image-forming optical system. Moreover, the optical path length becomes unfavorably long. Therefore, simply folding the optical path by each reflecting surface is unsuitable for a wide-angle optical system.

The overall size of an optical system can be reduced in the direction of the thickness by folding the optical path. In this case, however, the optical system unavoidably increases in size in the lateral direction. To avoid this problem, that is, to maintain the thin structure, and at the same time, avoid causing the optical system to increase in size in the lateral direction, the image-forming optical system according to the present invention is arranged such that optical paths formed by the second and third surfaces, which are two contiguous surfaces among the three reflecting surfaces, intersect each other in the prism so that a part of the optical path in the prism assumes a triangular shape and forms intersecting optical paths.

With the above arrangement, in which optical paths formed by the two contiguous reflecting surfaces intersect each other in the prism, it is possible to avoid causing the prism to increase in size in the lateral direction while maintaining the thin structure. Moreover, it is possible to reduce the amount of decentration of the two reflecting surfaces and hence possible to reduce the amount of decentration aberrations produced in the prism. Furthermore, by distributing the positive power to the two surfaces, the amount of decentration aberrations produced in the prism can be further reduced.

The first reflecting surface other than the two reflecting surfaces enables freedom to be given for the direction in which the image plane is positioned or for the direction in which a light beam from the object enters the prism. Therefore, an optimum configuration can be selected for the image-forming optical system according to each particular purpose thereof.

According to the present invention, at least one of the three reflecting surfaces has a curved surface configuration that gives a power to a light beam, and the curved surface configuration has a rotationally asymmetric surface configuration that corrects aberrations due to decentration. With this arrangement, the prism member is given a positive power required for the image-forming optical system, and at the same time, it becomes possible to correct rotationally asymmetric decentration aberrations, as stated above.

In the image-forming optical system according to the present invention, the intersecting optical paths formed by the second and third reflecting surfaces are desirably arranged to form either a grade crossing where a plane defined by the axial principal ray incident on the third reflecting surface and the axial principal ray reflected from the third reflecting surface coincides with a plane defined by the axial principal ray incident on the second reflecting surface and the axial principal ray reflected from the second reflecting surface, or a two-level crossing where the plane defined by the axial principal ray incident on the third reflecting surface and the axial principal ray reflected from the third reflecting surface three-dimensionally intersects the plane defined by the axial principal ray incident on the second reflecting surface and the axial principal ray reflected from the second reflecting surface within the range of ±20 degrees.

It is desirable from the viewpoint of either of decentration aberration correction and productivity that the intersecting optical paths formed by the second and third reflecting surfaces should intersect each other in a plane. However, from the viewpoint of obtaining freedom for selecting an optimum configuration for the image-forming optical system according to each particular purpose thereof, it is also desirable to adopt a two-level crossing where the plane of incidence in which the axial principal ray is incident on the third reflecting surface (i.e. the plane defined by the axial principal ray incident on the third reflecting surface and the axial principal ray reflected from the third reflecting surface) three-dimensionally intersects the plane of incidence in which the axial principal ray is incident on the second reflecting surface (i.e. the plane defined by the axial principal ray incident on the second reflecting surface and the axial principal ray reflected from the second reflecting surface) within the range of ±20 degrees. However, if the above-described angle exceeds ±20 degrees, it becomes necessary to correct aberrations at all positions of the image plane independently and simultaneously. In actual practice, it becomes extremely difficult to effect aberration correction.

Regarding the order in which the surfaces are arranged to form an optical path in the image-forming optical system according to the present invention, the prism member may have, in order in which light passes from the object side thereof, the first transmitting surface, the first reflecting surface, the second reflecting surface, the third reflecting surface, and the second transmitting surface so as to form an optical path in the order mentioned. Alternatively, the prism member may have, in order in which light passes from the object side thereof, the first transmitting surface, the second reflecting surface, the third reflecting surface, the first reflecting surface, and the second transmitting surface so as to form an optical path in the order mentioned.

FIG. 17 shows classifications of layouts adoptable in the image-forming optical system according to the present invention to arrange the first reflecting surface 11, the second reflecting surface 12, the third reflecting surface 13, and the image plane 3. In the case of parts (a) and (b) of FIG. 17, a light beam from an object is reflected by the first reflecting surface 11, the second reflecting surface 12 and the third reflecting surface 13 in the order mentioned and forms an image of the object on the image plane 3. In the case of parts (c) and (d) of FIG. 17, a light beam from an object is reflected by the second reflecting surface 12, the third reflecting surface 13 and the first reflecting surface 11 in the order mentioned and forms an image of the object on the image plane 3. In the case of part (a) of FIG. 17, the second reflecting surface 12 is placed so that the light beam reflected from the second reflecting surface 12 travels toward the object side, and the image plane 3 is formed at a position opposite to the object side across the prism member. In the case of part (b) of FIG. 17, the second reflecting surface 12 is placed so that the light beam reflected from the second reflecting surface 12 travels away from the object side, and the image plane 3 is formed on the object side of the prism member. In the case of part (c) of FIG. 17, the first reflecting surface 11 is placed so that the light beam reflected from the first reflecting surface 11 travels away from the object side, and the image plane 3 is formed at a position opposite to the object side across the prism member. In the case of part (d) of FIG. 17, the first reflecting surface 11 is placed so that the light beam reflected from the first reflecting surface 11 travels toward the object side, and the image plane 3 is formed on the object side of the prism member.

In the case of parts (a) and (c) of FIG. 17, the three reflecting surfaces are so arranged that the direction of turn of the light beam along the triangular optical path formed by the second reflecting surface 12 and the third reflecting surface 13 is the same as the direction of turn of the light beam along the optical path incident on and reflected from the first reflecting surface 11 [counterclockwise turn in the case of part (a) of FIG. 17; clockwise turn in the case of part (c) of FIG. 17]. In the case of part (b) and (d) of FIG. 17, the three reflecting surfaces are so arranged that the direction of turn of the light beam along the triangular optical path formed by the second reflecting surface 12 and the third reflecting surface 13 is opposite to the direction of turn of the light beam along the optical path incident on and reflected from the first reflecting surface 11.

In the present invention, the first reflecting surface and second transmitting surface of the prism member may be formed from the identical surface. In this case, the identical surface can be arranged to have both reflecting and transmitting actions by forming the first reflecting surface as a totally reflecting surface.

In the present invention, two of the three reflecting surfaces, more specifically, the second and third reflecting surfaces, or the first and second reflecting surfaces, or the first and third reflecting surfaces, may be arranged to have a rotationally asymmetric surface configuration that gives a power to a light beam and corrects aberrations due to decentration. It is a matter of course that all the three reflecting surfaces may be arranged to have a rotationally asymmetric surface configuration that gives a power to a light beam and corrects aberrations due to decentration.

Either or both of the first and second transmitting surfaces may be arranged to have a rotationally asymmetric surface configuration that gives a power to a light beam and corrects aberrations due to decentration. A refracting surface having such a surface configuration is effective in correcting aberrations due to decentration.

It should be noted that in the present invention the second transmitting surface may be a plane surface. The first transmitting surface may also be a plane surface.

A compact and high-performance prism optical system can be attained by setting an appropriate optical path using three reflecting surfaces as stated above. However, there are cases where satisfactory performance cannot be obtained, depending upon the position of an aperture in the optical system.

In an ordinary refracting optical system or the like, it is easy to place an aperture, e.g. an aperture stop, between lenses. In the case of a prism optical system, however, the prism is filled therein with a medium. Therefore, in order to place an aperture in an intermediate portion of the optical path, it is necessary to divide the prism so that an aperture stop can be placed, or it is necessary to provide the prism with a groove or the like to define an aperture. In the present invention also, the prism can be divided to place an aperture. However, if the prism is divided, performance degradation due to assembling errors is likely to occur. Therefore, division of the prism is unfavorable from the viewpoint of performance. Formation of a groove in the prism to define an aperture is also unfavorable from the viewpoint of performance because there are influences of diffused reflection and scattered light in actual practice. In a case where an aperture is defined by a groove, because the aperture cannot be stopped down physically, another member such as an ND filter is needed, resulting in a rise in cost. Thus, placing an aperture in an intermediate portion of the optical path causes various problems unfavorably.

If an aperture is placed outside the prism, it becomes unnecessary to divide the prism or to form a groove. Accordingly, the above-described problems relating to performance can be solved. Therefore, it is desirable to place the three reflecting surfaces of the prism between an aperture of the optical system and the object plane or between the aperture and the image plane. It is particularly desirable to place an aperture so that an entrance pupil of the image-forming optical system is formed between the prism member and the object plane.

It should be noted that a rotationally asymmetric surface configuration used for the reflecting and transmitting surfaces in the present invention are desirably a plane-symmetry free-form surface having only one plane of symmetry.

As has been described above, adopting the arrangement of the present invention makes it possible to obtain a prism optical system of high performance despite its compact and thin structure in comparison to the conventional arrangement.

The following is a description of conditions concerning the second and third reflecting surfaces, which form intersecting optical paths, among the reflecting surfaces. To construct the prism in a compact form effectively by making the optical axis cross itself so as to be folded, it is necessary to appropriately set the angles of reflection at the reflecting surfaces forming the intersecting optical paths. Therefore, it is desirable that at least one of the two reflecting surfaces (second and third reflecting surfaces) forming the intersecting optical paths should satisfy the following condition:

$$5° < \theta < 50° \tag{1}$$

where θ is the angle of incidence of the axial principal ray on the second and third reflecting surfaces.

If θ is not smaller than the upper limit of the condition (1), i.e. 50°, the reflection angle becomes excessively large, so that the optical axis cannot effectively be folded. Consequently, even if the optical axis is made to cross itself, the prism cannot effectively be made compact in size, If θ is not larger than the lower limit, i.e. 5°, the reflection angle becomes excessively small. Consequently, the reflecting surface undesirably overlaps the effective portion of another reflecting surface, and it becomes impossible to construct the prism member of the present invention.

It is even more desirable to satisfy the following condition:

$$15° < \theta < 35° \tag{1-1}$$

It is desirable for both the second and third reflecting surfaces to satisfy the following condition:

$$5° < \theta < 50° \tag{2}$$

If θ is not smaller than the upper limit of the condition (2), i.e. 50°, the prism cannot effectively be made compact, and if θ is not larger than the lower limit, i.e. 5°, it becomes difficult to construct the desired prism, as in the case of the condition (1).

It is even more desirable to satisfy the following condition:

$$10° < \theta < 45° \tag{2-1}$$

Let us define the power of a decentered optical system and that of a decentered optical surface. As shown in FIG. 18, when the direction of decentration of a decentered optical system S is taken in the Y-axis direction, a light ray which is parallel to the axial principal ray of the decentered optical system S and which has a small height d in the YZ-plane is made to enter the decentered optical system S from the object side thereof. The angle that is formed between that ray and the axial principal ray exiting from the decentered optical system S as the two rays are projected onto the YZ-plane is denoted by δy, and δy/d is defined as the power Py in the Y-axis direction of the decentered optical system S. Similarly, a light ray which is parallel to the axial principal ray of the decentered optical system S and which has a small height d in the X-axis direction, which is perpendicular to the YZ-plane, is made to enter the decentered optical system S from the object side thereof. The angle that is formed between that ray and the axial principal ray exiting from the decentered optical system S as the two rays are projected onto a plane perpendicularly intersecting the YZ-plane and containing the axial principal ray is denoted by δx, and δx/d is defined as the power Px in the X-axis direction of the decentered optical system S. The power Pny in the Y-axis direction and power Pnx in the X-axis direction of a decentered optical surface n constituting the decentered optical system S are defined in the same way as the above.

Furthermore, the reciprocals of the above-described powers are defined as the focal length Fy in the Y-axis direction of the decentered optical system S, the focal length Fx in the X-axis direction of the decentered optical system S, the focal length Fny in the Y-axis direction of the decentered optical surface n, and the focal length Fnx in the X-axis direction of the decentered optical surface n, respectively.

Incidentally, at the portion where the optical axis crosses itself, spacings between the two reflecting surfaces relating to the intersecting optical paths and optical surfaces placed in front of and behind the reflecting surfaces need to be set appropriately so that both the incident light beam and the emergent light beam are filled with the prism medium. Therefore, if the prism optical system is arranged so that the light beam diverges, the light beam is vignetted. Therefore, the light beam cannot sufficiently-be passed. Moreover, the field angle cannot be enlarged, and the prism optical system cannot be constructed in a compact form. Accordingly, it is desirable that at least one of the second and third reflecting surfaces should have a positive power to converge the light beam.

When the powers in the X- and Y-axis directions of the second and third reflecting surfaces forming the intersecting optical paths are denoted by Psx and Psy, and the powers in the X- and Y-axis directions of the prism are denoted by Px and Py, it is desirable that at least one of the second and third reflecting surfaces should satisfy the following condition:

$$0.001 < Psx/Px < 100 \tag{3}$$

If Psx/Px is not smaller than the upper limit of the condition (3), i.e. 100, the power of the surface becomes excessively strong. Consequently, excessively large aberrations occur in the X-axis direction, and it becomes impossible to correct them satisfactorily. Accordingly, it becomes difficult to ensure the high performance. If Psx/Px is not larger than the lower limit, i.e. 0.001, the power of the surface becomes excessively weak, and the light beam converging effect reduces. Consequently, the prism optical system cannot effectively be made compact in the X-axis direction.

It is even more desirable to satisfy the following condition:

$$0.01 < Psx/Px < 1 \tag{3-1}$$

It is still more desirable to satisfy the following condition:

$$0.4 < Psx/Px < 0.65 \tag{3-2}$$

It is also desirable to satisfy the following condition:

$$0.001 < Psy/Py < 100 \tag{4}$$

If Psy/Py is not smaller than the upper limit of the condition (4), i.e. 100, the power of the surface becomes excessively strong. Consequently, excessively large aberrations occur in the Y-axis direction, and it becomes impossible to correct them satisfactorily. Accordingly, it becomes difficult to ensure the high performance. If Psy/Py is not larger than the lower limit, i.e. 0.001, the power of the surface becomes excessively weak, and the light beam converging effect reduces. Consequently, the prism optical system cannot effectively be made compact in the Y-axis direction.

It is even more desirable to satisfy the following condition:

$$0.01 < Psy/Py < 1 \tag{4-1}$$

It is still more desirable to satisfy the following condition:

$$0.3 < Psy/Py < 0.7 \tag{4-2}$$

It is preferable that both the second and third reflecting surfaces should have a positive power. If both the reflecting surfaces are arranged to have a positive power, the light beam is further converged. Accordingly, the prism can be constructed in a compact form.

When the powers in the X- and Y-axis directions of the second and third reflecting surfaces are denoted by P2x, P3x, P2y and P3y, and the powers in the X- and Y-axis directions of the prism are denoted by Px and Py, it is desirable to satisfy the following conditions:

$$0.001 < P2x/Px < 100 \tag{5}$$

$$0.001 < P3x/Px < 100 \tag{6}$$

If P2x/Px or P3x/Px is not smaller than the upper limits of these conditions, i.e. 100, the power of the surface becomes excessively strong. Consequently, excessively large aberrations occur in the X-axis direction. Accordingly, it becomes difficult to ensure the high performance. If P2x/Px or P3x/Px is not larger than the lower limits, i.e. 0.001, the power of the surface becomes excessively weak, and the light beam converging effect reduces. Consequently, the prism optical system cannot effectively be made compact in the X-axis direction.

It is even more desirable to satisfy the following conditions:

$$0.01 < P2x/Px < 1 \tag{5-1}$$

$$0.01 < P3x/Px < 1 \tag{6-1}$$

It is desirable to satisfy the following conditions:

$$0.001 < P2y/Py < 100 \tag{7}$$

$$0.001 < P3y/Py < 100 \tag{8}$$

If P2y/Py or P3y/Py is not smaller than the upper limits of these conditions, i.e. 100, the power of the surface becomes excessively strong. Consequently, excessively large aberrations occur in the Y-axis direction. Accordingly, it becomes difficult to ensure the high performance. If P2y/Py or P3y/Py is not larger than the lower limits, i.e. 0.001, the power of the surface becomes excessively weak, and the light beam converging effect reduces. Consequently, the prism optical system cannot effectively be made compact in the Y-axis direction.

It is even more desirable to satisfy the following conditions:

$$0.01 < P2y/Py < 1 \tag{7-1}$$

$$0.01 < P3y/Py < 1 \tag{8-1}$$

In the prism of the present invention, reflecting surfaces other than the totally reflecting surface are preferably formed from a reflecting surface having a thin film of a metal, e.g. aluminum or silver, formed on the surface thereof, or a reflecting surface formed from a dielectric multilayer film. In the case of a metal thin film having reflecting action, a high reflectivity can be readily obtained. The use of a dielectric reflecting film is advantageous in a case where a reflecting film having wavelength selectivity or minimal absorption is to be formed.

Thus, it is possible to obtain a low-cost and compact image-forming optical system in which the prism manufacturing accuracy is favorably eased.

In the image-forming optical system according to the present invention, focusing of the image-forming optical system can be effected by moving all the constituent elements or moving the prism. However, it is also possible to effect focusing by moving the image-formation plane in the direction of the axial principal ray exiting from the surface closest to the image side. By doing so, it is possible to prevent displacement of the axial principal ray on the entrance side due to focusing even if the direction in which the axial principal ray from the object enters the optical system is not coincident with the direction of the axial principal ray exiting from the surface closest to the image side owing to the decentration of the image-forming optical system. It is also possible to effect focusing by moving a plurality of wedge-shaped prisms, which are formed by dividing a plane-parallel plate, in a direction perpendicular to the Z-axis. In this case also, focusing can be performed independently of the decentration of the image-forming optical system.

In the present invention, temperature compensation can be made by forming the object-side part and image-side part of the prism using different materials. By providing the object-side part and image-side part of the prism with powers of different signs, it is possible to prevent the focal shift due to changes in temperature, which is a problem arising when a plastic material is used to form a prism.

In a case where the two prism parts are cemented together in the present invention, it is desirable that each of the two prism parts should have a positioning portion for setting a relative position on a surface having no optical action. In a case where two prism parts each having a reflecting surface with a power are cemented together as in the present invention, in particular, relative displacement of each prism part causes the performance to be deteriorated. Therefore, in the present invention, a positioning portion for setting a relative position is provided on each surface of each prism part that has no optical action, thereby ensuring the required positional accuracy. Thus, the desired performance can be ensured. In particular, if the two prism parts are integrated into one unit by using the positioning portions and coupling members, it becomes unnecessary to perform assembly adjustment. Accordingly, the cost can be further reduced.

Furthermore, the optical path can be folded in a direction different from the decentration direction of the image-forming optical system according to the present invention by placing a reflecting optical member, e.g. a mirror, on the object side of the entrance surface of the image-forming optical system. By doing so, the degree of freedom for layout of the image-forming optical system further increases, and the overall size of the image-forming optical apparatus can be further reduced.

In the present invention, the image-forming optical system can be formed from a prism alone. By doing so, the number of components is reduced, and the cost is lowered. Furthermore, two prisms may be integrated into one prism with a stop put therebetween. By doing so, the cost can be further reduced.

In the present invention, the image-forming optical system may include another lens (positive or negative lens) as a constituent element in addition to the prism at either or each of the object and image sides of the prism.

The image-forming optical system according to the present invention may be a fast, single focal length lens system. Alternatively, the image-forming optical system may be arranged in the form of a zoom lens system (variable-magnification image-forming optical system) by combining it with a single or plurality of refracting optical systems that may be provided on the object or image side of the prism.

In the present invention, the refracting and reflecting surfaces of the image-forming optical system may be formed from spherical surfaces or rotationally symmetric aspherical surfaces.

In a case where the above-described image-forming optical system according to the present invention is placed in an image pickup part of an image pickup apparatus, or in a case where the image pickup apparatus is a photographic apparatus having a camera mechanism, it is possible to adopt an arrangement in which a prism member is placed closest to the object side among optical elements having an optical action, and the entrance surface of the prism member is decentered with respect to the optical axis, and further a cover member is placed on the object side of the prism member at right angles to the optical axis. The arrangement may also be such that the prism member has on the object side thereof an entrance surface decentered with respect to the optical axis, and a cover lens having a power is placed on the object side of the entrance surface of the prism member in coaxial relation to the optical axis so as to face the entrance surface across an air spacing.

If a prism member is placed closest to the object side and a decentered entrance surface is provided on the front side of a photographic apparatus as stated above, the obliquely tilted entrance surface is seen from the subject, and it gives the illusion that the photographic center of the apparatus is deviated from the subject when the entrance surface is seen from the subject side. Therefore, a cover member or a cover lens is placed at right angles to the optical axis, thereby preventing the subject from feeling incongruous when seeing the entrance surface, and allowing the subject to be photographed with the same feeling as in the case of general photographic apparatus.

A finder optical system can be formed by using any of the above-described image-forming optical systems according to the present invention as a finder objective optical system and adding an image-inverting optical system for erecting an object image formed by the finder objective optical system and an ocular optical system.

In addition, it is possible to construct a camera apparatus by using the finder optical system and an objective optical system for photography provided in parallel to the finder optical system.

In addition, an image pickup optical system can be constructed by using any of the foregoing image-forming optical systems according to the present invention and an image pickup device placed in an image plane formed by the image-forming optical system.

In addition, a camera apparatus can be constructed by using any of the foregoing image-forming optical systems according to the present invention as an objective optical system for photography, and a finder optical system placed in an optical path separate from an optical path of the objective optical system for photography or in an optical path split from the optical path of the objective optical system for photography.

In addition, an electronic camera apparatus can be constructed by using any of the foregoing image-forming optical systems according to the present invention, an image pickup device placed in an image plane formed by the image-forming optical system, a recording medium for recording image information received by the image pickup device, and an image display device that receives image information from the recording medium or the image pickup device to form an image for observation.

In addition, an endoscope system can be constructed by using an observation system having any of the foregoing image-forming optical systems according to the present invention and an image transmitting member for transmitting an image formed by the image-forming optical system along a longitudinal axis, and an illumination system having an illuminating light source and an illuminating light transmitting member for transmitting illuminating light from the illuminating light source along the longitudinal axis.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 16 is a conceptual view showing an arrangement in which a prism optical system according to the present invention is applied to a projection optical system of a presentation system.

DESCRIPTION OF THE PREFERRED EMBODIMENTS

Examples 1 to 14 of the image-forming optical system according to the present invention will be described below. It should be noted that constituent parameters of each example will be shown later.

Figure 1:
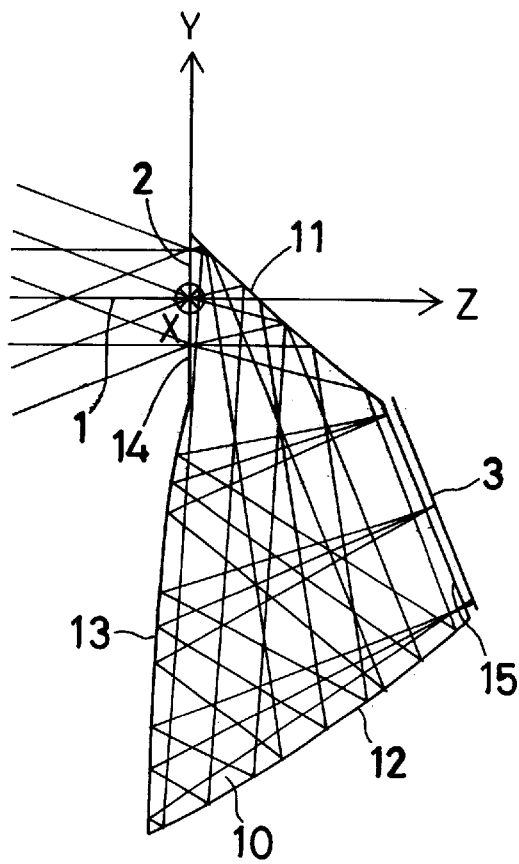
FIG. 1 is a sectional view of an image-forming optical system according to Example 1 of the present invention.

In Examples 1 to 13, as shown in FIG. 1, the center of a stop 2 is defined as the origin of a decentered optical system, and an axial principal ray 1 is defined by a ray emanating from the center of an object (not shown in the figure) and passing through the center of the stop 2 to reach the center of an image plane 3. A Z-axis is taken in the direction in which the axial principal ray 1 travels from the object center to the first surface (first transmitting surface) 14 of the optical system. A plane containing the Z-axis and the center of the image plane 3 is defined as a YZ-plane. A Y-axis is taken in a direction perpendicularly intersecting the Z-axis in a plane in which rays are folded by the surfaces of the optical system. The direction in which the Z-axis extends from the object point toward the first surface 14 of the optical system is defined as a positive direction of the Z-axis. The upward direction as viewed in FIG. 1 is defined as a positive direction of the Y-axis. An axis that constitutes a right-handed orthogonal coordinate system in combination with the Y- and Z-axes is defined as an X-axis.

In Example 1 to 13, decentration of each surface is made in the YZ-plane, and one and only plane of symmetry of each rotationally asymmetric free-form surface is the YZ-plane.

In Example 14, the center of a stop 2 is defined as the origin of a decentered optical system, and an axial principal ray 1 is defined by a ray emanating from the center of an object and passing through the center of the stop 2 to reach the center of an image plane 3. A Z-axis is taken in the direction in which the axial principal ray 1 travels from the object center to the first surface (first transmitting surface) 14 of the optical system. X- and Y-axes are taken in mutually intersecting directions that perpendicularly intersect the Z-axis. The direction in which the Z-axis extends from the object point toward the first surface 14 of the optical system is defined as a positive direction of the Z-axis.

Regarding decentered surfaces, each surface is given displacements in the X-, Y- and Z-axis directions (X, Y and Z, respectively) of the vertex position of the surface from the origin of the optical system, and tilt angles (degrees) of the center axis of the surface [the Z-axis of the above equation (a) in regard to free-form surfaces; the Z-axis of the following equation (b) in the case of aspherical surfaces] with respect to the X-, Y- and Z-axes ($\alpha$, $\beta$ and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis. It should be noted that the way of rotating the center axis of each surface through $\alpha$, $\beta$ and $\gamma$ is as follows. First, the center axis of the surface and the XYZ orthogonal coordinate system are rotated through $\alpha$ counterclockwise about the X-axis. Then, the rotated center axis of the surface is rotated through $\beta$ counterclockwise about the Y-axis of the new coordinate system, and the coordinate system once rotated is also rotated through $\beta$ counterclockwise about the Y-axis. Then, the center axis of the surface, which has been rotated twice, is rotated through $\gamma$ clockwise about the Z-axis of the new coordinate system.

Among optical surfaces constituting the optical system in each example, a specific surface and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (a). The Z-axis of the defining equation is the axis of the free-form surface.

Aspherical surfaces used in the present invention are rotationally symmetric aspherical surfaces given by the following equation:

$$Z=(y^2/R)/[1+\{1-(1+K)y^2/R^2\}^{1/2}]+Ay^4+By^6+Cy^8+Dy^{10}+\ldots \quad (b)$$

In the above equation, Z is an optical axis (axial principal ray) for which the direction of travel of light is defined as a positive direction, and y is taken in a direction perpendicular to the optical axis. R is a paraxial curvature radius, K is a conic constant, and A, B, C, D . . . are 4th-, 6th-, 8th- and 10th-order aspherical coefficients, respectively. The Z-axis of this defining equation is the axis of the rotationally symmetric aspherical surface.

In the constituent parameters (shown later), those terms concerning free-form surfaces and aspherical surfaces for which no data is shown are zero. The refractive index is expressed by the refractive index for the spectral d-line (wavelength: 587.56 nanometers). Lengths are given in millimeters.

Free-form surfaces may also be defined by Zernike polynomials. That is, the configuration of a free-form surface may be defined by the following equation (c). The Z-axis of the defining equation (c) is the axis of Zernike polynomial. A rotationally asymmetric surface is defined by polar coordinates of the height of the Z-axis with respect to the XY-plane. In the equation (c), R is the distance from the Z-axis in the XY-plane, and A is the azimuth angle about the Z-axis, which is expressed by the angle of rotation measured from the X-axis.

$$x = R \times \cos(A)$$

$$y = R \times \sin(A)$$

$$\begin{aligned}Z =\ & D_2 + D_3 R\cos(A) + D_4 R\sin(A) + \\ & D_5 R^2 \cos(2A) + D_6(R^2 - 1) + D_7 R^2 \sin(2A) + \\ & D_8 R^3 \cos(3A) + D_9(3R^3 - 2R)\cos(A) + \\ & D_{10}(3R^3 - 2R)\sin(A) + D_{11} R^3 \sin(3A) + D_{12} R^4 \cos(4A) + \\ & D_{13}(4R^4 - 3R^2)\cos(2A) + D_{14}(6R^4 - 6R^2 + 1) + \\ & D_{15}(4R^4 - 3R^2)\sin(2A) + D_{16} R^4 \sin(4A) + D_{17} R^5 \cos(5A) + \\ & D_{18}(5R^5 - 4R^3)\cos(3A) + D_{19}(10R^5 - 12R^3 + 3R)\cos(A) + \\ & D_{20}(10R^5 - 12R^3 + 3R)\sin(A) + D_{21}(5R^5 - 4R^3)\sin(3A) + \\ & D_{22} R^5 \sin(5A) + D_{23} R^6 \cos(6A) + D_{24}(6R^6 - 5R^4)\cos(4A) + \\ & D_{25}(15R^6 - 20R^4 + 6R^2)\cos(2A) + \\ & D_{26}(20R^6 - 30R^4 + 12R^2 - 1) + \\ & D_{27}(15R^6 - 20R^4 + 6R^2)\sin(2A) + \\ & D_{28}(6R^6 - 5R^4)\sin(4A) + D_{29} R^6 \sin(6A) \ldots\end{aligned} \quad (c)$$

In the above equation, to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ should be used.

Other examples of surfaces usable in the present invention are expressed by the following defining equation (d):

$$Z = \Sigma\Sigma C_{nm} XY$$

Assuming that k=7 (polynomial of degree 7), for example, a free-form surface is expressed by an expanded form of the above equation as follows:

$$\begin{aligned}Z =\ & C_2 + C_3 y + C_4|x| + C_5 y^2 + C_6 y|x| + C_7 x^2 + C_8 y^3 + \\ & C_9 y^2 |x| + C_{10} yx^2 + C_{11}|x^3| + C_{12} y^4 + C_{13} y^3 |x| + \\ & C_{14} y^2 x^2 + C_{15} y|x^3| + C_{16} x^4 + C_{17} y^5 + C_{18} y^4 |x| + \\ & C_{19} y^3 x^2 + C_{20} y^2 |x^3| + C_{21} yx^4 + C_{22}|x^5| + \\ & C_{23} y^6 + C_{24} y^5 |x| + C_{25} y^4 x^2 + C_{26} y^3 |x^3| + C_{27} y^2 x^4 + \\ & C_{28} y|x^5| + C_{29} x^6 + C_{30} y^7 + C_{31} y^6 |x| + C_{32} y^5 x^2 + \\ & C_{33} y^4 |x^3| + C_{34} y^3 x^4 + C_{35} y^2 |x^5| + C_{36} yx^6 + C_{37}|x^7|\end{aligned} \quad (d)$$

Although in the examples of the present invention the surface configuration is expressed by a free-form surface using the above equation (a), it should be noted that the same advantageous effect can be obtained by using the above equation (c) or (d).

Although the prisms of the optical systems according to Examples 1 to 14 are formed by using a plastic material, it should be noted that the prisms may be made of glass. When a plastic material is used, in particular, it is desirable to use a material of low moisture absorption because performance degradation caused by environmental changes is minimized by the use of such a material.

EXAMPLES 1 TO 5

FIG. 1 is a sectional view of Example 1 taken along the YZ-plane containing the axial principal ray. The sectional views of Examples 2 to 5 are similar to FIG. 1. Therefore, illustration of Examples 2 to 5 is omitted.

In all Examples 1 to 5: the horizontal (X-axis direction) half field angle is 26.31°; the vertical (Y-axis direction) half field angle is 20.35°; F-number is 2.8; and the image height is 2.69×2.015 millimeters. In Example 1, the X-axis direction focal length Fx is 6.45 millimeters, and the Y-axis direction focal length Fy is 6.27 millimeters. In Example 2, the X-axis direction focal length Fx is 6.05 millimeters, and the Y-axis direction focal length Fy is 5.74 millimeters. In Example 3, the X-axis direction focal length Fx is 6.23 millimeters, and the Y-axis direction focal length Fy is 5.76 millimeters. In Example 4, the X-axis direction focal length Fx is 6.83 millimeters, and the Y-axis direction focal length Fy is 6.70 millimeters. In Example 5, the X-axis direction focal length Fx is 6.67 millimeters, and the Y-axis direction focal length Fy is 6.46 millimeters.

Constituent parameters of these Examples will be shown later. In the constituent parameters, free-form surfaces are denoted by "FFS", and rotationally symmetric aspherical surfaces by "ASS". The same shall apply to the following Examples.

Examples 1 and 5 each comprise only one prism 10 of positive power. The prism 10 has, in order in which light passes from the object side, a stop 2, a first transmitting surface 14, a first reflecting surface 11, a second reflecting surface 12, a third reflecting surface 13, a second transmitting surface 15, and an image plane 3. The first transmitting surface 14, the first reflecting surface 11, the second reflecting surface 12, the third reflecting surface 13 and the second transmitting surface 15 are optical surfaces separate from each other. These Examples are prism optical systems arranged as shown in part (a) of FIG. 17.

The configuration of each surface is as follows. In Example 1: the first transmitting surface 14 is a plane surface; the first reflecting surface 11, the second reflecting surface 12 and the third reflecting surface 13 are free-form surfaces; and the second transmitting surface 15 is a plane surface.

In Example 2: the first transmitting surface 14, the first reflecting surface 11, the second reflecting surface 12 and the third reflecting surface 13 are free-form surfaces; and the second transmitting surface 15 is a plane surface.

In Example 3: the first transmitting surface 14 is a spherical surface; the first reflecting surface 11 and the second reflecting surface 12 are free-form surfaces; the third reflecting surface 13 is a rotationally symmetric aspherical surface; and the second transmitting surface 15 is a plane surface.

In Example 4: the first transmitting surface 14 is a spherical surface; the first reflecting surface 11 is a rotationally symmetric aspherical surface; the second reflecting surface 12 is a free-form surface; the third reflecting surface 13 is a rotationally symmetric aspherical surface; and the second transmitting surface 15 is a plane surface.

In Example 5: the first transmitting surface 14 is a spherical surface; the first reflecting surface 11, the second reflecting surface 12 and the third reflecting surface 13 are free-form surfaces; and the second transmitting surface 15 is a plane surface.

EXAMPLES 6 TO 10

Figure 2:
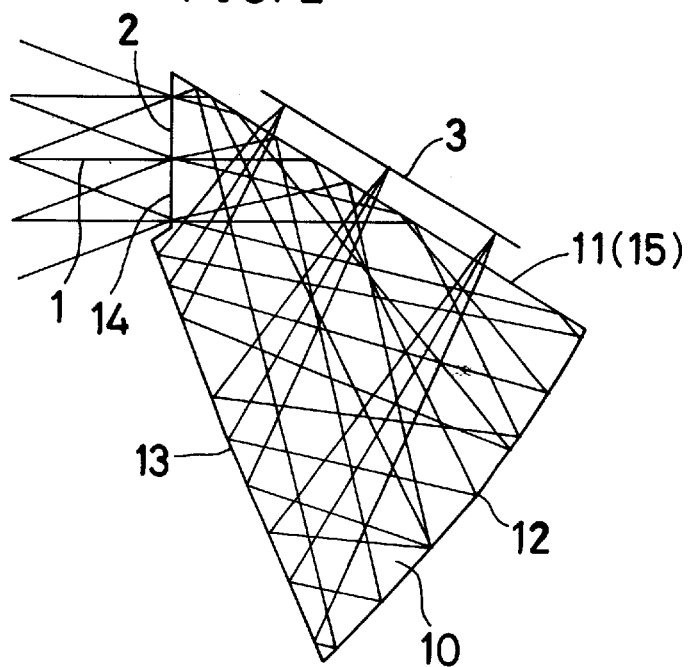
FIG. 2 is a sectional view of an image-forming optical system according to Example 6 of the present invention.

FIG. 2 is a sectional view of Example 6 taken along the YZ-plane containing the axial principal ray. The sectional views of Examples 7 to 10 are similar to FIG. 2. Therefore, illustration of Examples 7 to 10 is omitted.

In all Examples 6 to 10: the horizontal (X-axis direction) half field angle is 26.31°; the vertical (Y-axis direction) half field angle is 20.35°; F-number is 2.8; and the image height is 2.69×2.015 millimeters. In Example 6, the X-axis direction focal length Fx is 5.85 millimeters, and the Y-axis direction focal length Fy is 5.67 millimeters. In Example 7, the X-axis direction focal length Fx is 5.86 millimeters, and the Y-axis direction focal length Fy is 5.73 millimeters. In Example 8, the X-axis direction focal length Fx is 6.11 millimeters, and the Y-axis direction focal length Fy is 6.00 millimeters. In Example 9, the X-axis direction focal length Fx is 5.85 millimeters, and the Y-axis direction focal length Fy is 5.71 millimeters. In Example 10, the X-axis direction focal length Fx is 6.23 millimeters, and the Y-axis direction focal length Fy is 6.06 millimeters.

Examples 6 and 10 each comprise only one prism 10 of positive power. The prism 10 has, in order in which light passes from the object side, a stop 2, a first transmitting surface 14, a first reflecting surface 11, a second reflecting surface 12, a third reflecting surface 13, a second transmitting surface 15, and an image plane 3. The first reflecting surface 11 and the second transmitting surface 15 are formed from a single optical surface serving as both reflecting and transmitting surfaces. The first reflecting surface 11 is realized by total reflection at the optical surface. These Examples are prism optical systems arranged as shown in part (a) of FIG. 17.

The configuration of each surface is as follows. In Example 6: the first transmitting surface 14 is a plane surface; and the first reflecting surface 11 (second transmitting surface 15), the second reflecting surface 12 and the third reflecting surface 13 are free-form surfaces.

In Example 7: the first transmitting surface 14, the first reflecting surface 11 (second transmitting surface 15), the second reflecting surface 12 and the third reflecting surface 13 are free-form surfaces.

In Example 8: the first transmitting surface 14, the second reflecting surface 12 and the third reflecting surface 13 are free-form surfaces; and the first reflecting surface 11 (second transmitting surface 15) is a plane surface.

In Example 9: the first transmitting surface 14 is a plane surface; the first reflecting surface 11 (second transmitting surface 15) and the third reflecting surface 13 are free-form surfaces; and the second reflecting surface 12 is a spherical surface.

In Example 10: the first transmitting surface 14 and the third reflecting surface 13 are free-form surfaces; the first reflecting surface 11 (second transmitting surface 15) is a plane surface; and the second reflecting surface 12 is a spherical surface.

EXAMPLE 11

Figure 3:
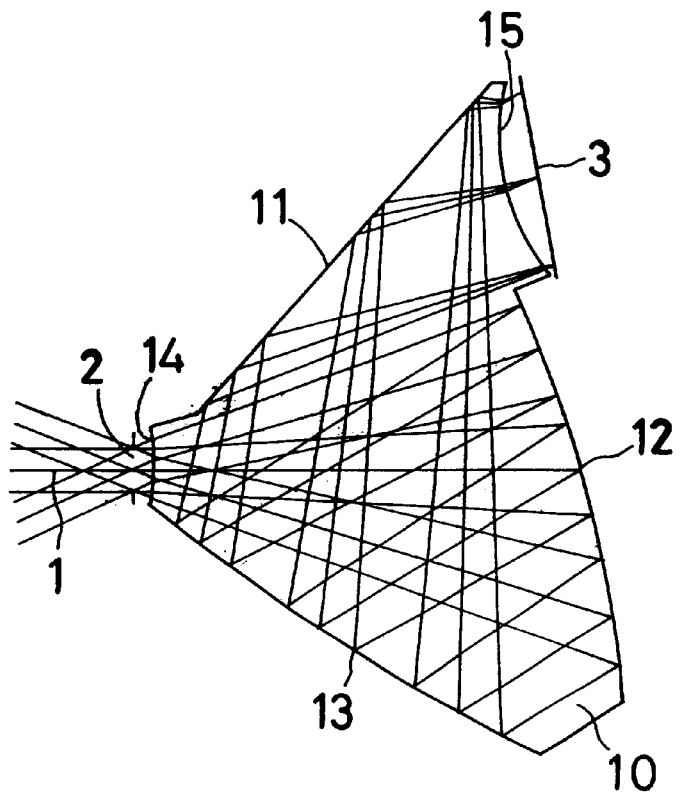
FIG. 3 is a sectional view of an image-forming optical system according to Example 11 of the present invention.

FIG. 3 is a sectional view of Example 11 taken along the YZ-plane containing the axial principal ray. In Example 11: the horizontal (X-axis direction) half field angle is 16.05°; the vertical (Y-axis direction) half field angle is 22.59°; F-number is 5.4; and the image height is 2.53×3.66 millimeters. The X-axis direction focal length Fx is 9.51 millimeters, and the Y-axis direction focal length Fy is 9.77 millimeters.

Example 11 comprises only one prism 10 of positive power. The prism 10 has, in order in which light passes from the object side, a stop 2, a first transmitting surface 14, a second reflecting surface 12, a third reflecting surface 13, a first reflecting surface 11, a second transmitting surface 15, and an image plane 3. The first transmitting surface 14, the first reflecting surface 11, the second reflecting surface 12, the third reflecting surface 13 and the second transmitting surface 15 are optical surfaces separate from each other. Example 11 is a prism optical system arranged as shown in part (c) of FIG. 17.

Regarding the configuration of each surface, the first transmitting surface 14, the first reflecting surface 11, the second reflecting surface 12, the third reflecting surface 13 and the second transmitting surface 15 are all free-form surfaces.

EXAMPLE 12

Figure 4:
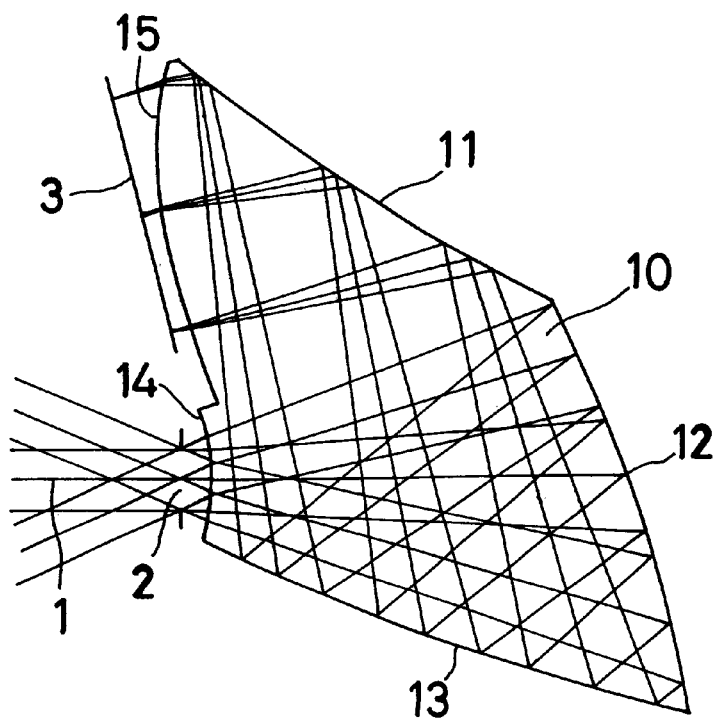
FIG. 4 is a sectional view of an image-forming optical system according to Example 12 of the present invention.

FIG. 4 is a sectional view of Example 12 taken along the YZ-plane containing the axial principal ray. In Example 12: the horizontal (X-axis direction) half field angle is 16.05°; the vertical (Y-axis direction) half field angle is 22.59°; F-number is 5.2; and the image height is 2.53×3.66 millimeters. The X-axis direction focal length Fx is 9.14 millimeters, and the Y-axis direction focal length Fy is 9.54 millimeters.

Example 12 comprises only one prism 10 of positive power. The prism 10 has, in order in which light passes from the object side, a stop 2, a first transmitting surface 14, a second reflecting surface 12, a third reflecting surface 13, a first reflecting surface 11, a second transmitting surface 15, and an image plane 3. The first transmitting surface 14, the first reflecting surface 11, the second reflecting surface 12, the third reflecting surface 13 and the second transmitting surface 15 are optical surfaces separate from each other. Example 12 is a prism optical system arranged as shown in part (d) of FIG. 17.

Regarding the configuration of each surface, the first transmitting surface 14, the first reflecting surface 11, the second reflecting surface 12, the third reflecting surface 13 and the second transmitting surface 15 are all free-form surfaces.

EXAMPLE 13

Figure 5:
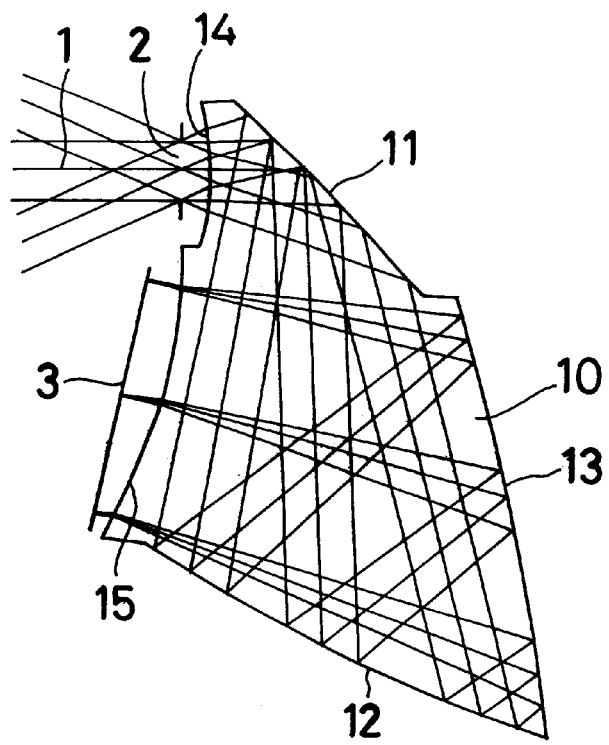
FIG. 5 is a sectional view of an image-forming optical system according to Example 13 of the present invention.

FIG. 5 is a sectional view of Example 13 taken along the YZ-plane containing the axial principal ray. In Example 13: the horizontal (X-axis direction) half field angle is 16.05°; the vertical (Y-axis direction) half field angle is 22.59°; F-number is 5.2; and the image height is 2.53×3.66 millimeters. The X-axis direction focal length Fx is 9.22 millimeters, and the Y-axis direction focal length Fy is 9.43 millimeters.

Example 13 comprises only one prism 10 of positive power. The prism 10 has, in order in which light passes from the object side, a stop 2, a first transmitting surface 14, a first reflecting surface 11, a second reflecting surface 12, a third reflecting surface 13, a second transmitting surface 15, and an image plane 3. The first transmitting surface 14, the first reflecting surface 11, the second reflecting surface 12, the third reflecting surface 13 and the second transmitting surface 15 are optical surfaces separate from each other. Example 13 is a prism optical system arranged as shown in part (b) of FIG. 17.

Regarding the configuration of each surface, the first transmitting surface 14, the first reflecting surface 11, the second reflecting surface 12, the third reflecting surface 13 and the second transmitting surface 15 are all free-form surfaces.

EXAMPLE 14

Figure 6:
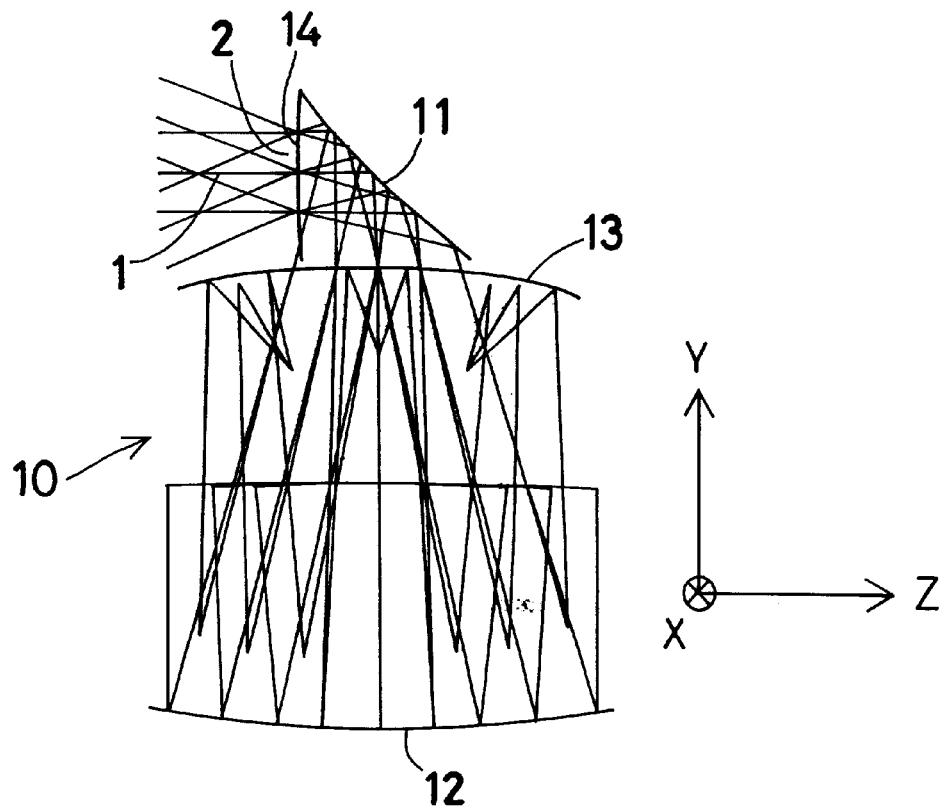
FIG. 6 is a sectional view taken along the YZ-plane, showing an image-forming optical system according to Example 14 of the present invention.
Figure 7:
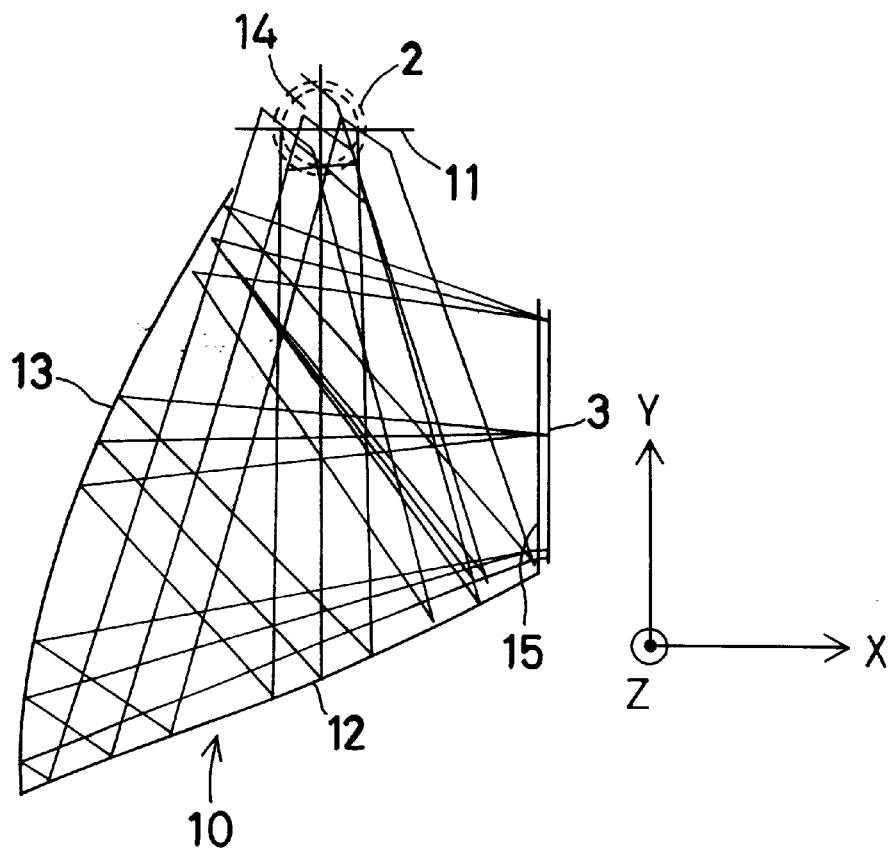
FIG. 7 is a sectional view taken along the XY-plane, showing the image-forming optical system according to Example 14 of the present invention.
Figure 8:
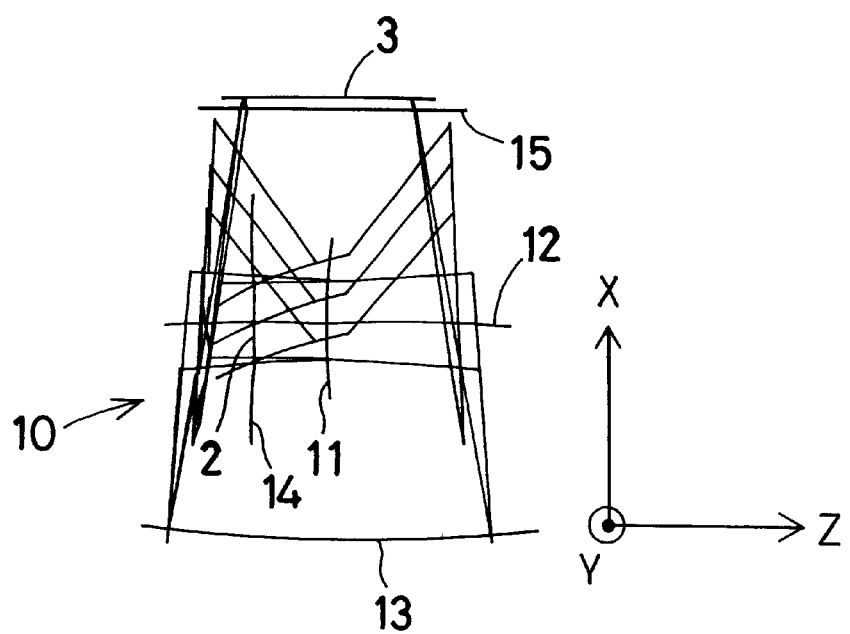
FIG. 8 is a sectional view taken along the XZ-plane, showing the image-forming optical system according to Example 14 of the present invention.

FIG. 6 is a sectional view of Example 14 taken along the YZ-plane. FIG. 7 is a sectional view of Example 14 taken along the XY-plane. FIG. 8 is a sectional view of Example 14 taken along the XZ-plane. In this Example, the prism optical system is three-dimensionally decentered. In Example 14: the horizontal (X-axis direction) half field angle is 26.31°; the vertical (Y-axis direction) half field angle is 20.35°; F-number is 2.8; and the image height is 2.69×2.015 millimeters. The X-axis direction focal length Fx is 6.44 millimeters, and the Y-axis direction focal length Fy is 6.66 millimeters.

Example 14 comprises only one prism 10 of positive power. The prism 10 has, in order in which light passes from the object side, a stop 2, a first transmitting surface 14, a first reflecting surface 11, a second reflecting surface 12, a third reflecting surface 13, a second transmitting surface 15, and an image plane 3. The first transmitting surface 14, the first reflecting surface 11, the second reflecting surface 12, the third reflecting surface 13 and the second transmitting surface 15 are optical surfaces separate from each other. In Example 14, the image plane 3 is approximately parallel to the YZ-plane; therefore, the prism optical system does not belong to any of the types shown in FIG. 17. However, the prism optical system of Example 14 may be said to be of a type somewhere between the types shown in parts (a) and (b) of FIG. 17.

Regarding the configuration of each surface, the first transmitting surface 14, the first reflecting surface 11, the second reflecting surface 12 and the third reflecting surface 13 are free-form surfaces, and the second transmitting surface 15 is a plane surface.

Constituent parameters in the foregoing Examples 1 to 14 are shown below. In the tables below, "FFS" denotes a free-form surface, and "ASS" denotes a rotationally symmetric aspherical surface.

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | ∞ | | (1) | 1.5254 | 56.2 |
| 3 | FFS① | | (2) | 1.5254 | 56.2 |
| 4 | FFS② | | (3) | 1.5254 | 56.2 |
| 5 | FFS③ | | (4) | 1.5254 | 56.2 |
| 6 | ∞ | | (5) | | |
| Image plane | ∞ | | (6) | | |

FFS①

| | | | | | |
|---|---|---|---|---|---|
| $C_4$ | $-2.8456 \times 10^{-3}$ | $C_6$ | $1.5657 \times 10^{-4}$ | $C_8$ | $-1.7753 \times 10^{-5}$ |
| $C_{10}$ | $-6.9886 \times 10^{-5}$ | $C_{11}$ | $2.1291 \times 10^{-4}$ | $C_{13}$ | $1.8307 \times 10^{-4}$ |
| $C_{15}$ | $-4.7199 \times 10^{-5}$ | | | | |

FFS②

| | | | | | |
|---|---|---|---|---|---|
| $C_4$ | $-1.8327 \times 10^{-2}$ | $C_6$ | $-1.8487 \times 10^{-2}$ | $C_8$ | $2.9258 \times 10^{-4}$ |
| $C_{10}$ | $1.4926 \times 10^{-4}$ | $C_{11}$ | $-3.4799 \times 10^{-6}$ | $C_{13}$ | $-9.1653 \times 10^{-5}$ |
| $C_{15}$ | $3.9643 \times 10^{-5}$ | | | | |

FFS③

| | | | | | |
|---|---|---|---|---|---|
| $C_4$ | $1.3966 \times 10^{-2}$ | $C_6$ | $7.7703 \times 10^{-3}$ | $C_8$ | $9.0528 \times 10^{-4}$ |
| $C_{10}$ | $6.3060 \times 10^{-4}$ | $C_{11}$ | $3.0604 \times 10^{-5}$ | $C_{13}$ | $-6.2281 \times 10^{-5}$ |
| $C_{15}$ | $1.3225 \times 10^{-4}$ | | | | |

-continued

Displacement and tilt(1)

| X | 0.00 | Y | 0.00 | Z | 0.00 |
|---|---|---|---|---|---|
| α | 0.00 | β | 0.00 | γ | 0.00 |

Displacement and tilt(2)

| X | 0.00 | Y | 0.00 | Z | 1.55 |
|---|---|---|---|---|---|
| α | 49.57 | β | 0.00 | γ | 0.00 |

Displacement and tilt(3)

| X | 0.00 | Y | -8.84 | Z | 2.97 |
|---|---|---|---|---|---|
| α | -56.01 | β | 0.00 | γ | 0.00 |

Displacement and tilt(4)

| X | 0.00 | Y | -6.68 | Z | -0.60 |
|---|---|---|---|---|---|
| α | -4.18 | β | 0.00 | γ | 0.00 |

Displacement and tilt(5)

| X | 0.00 | Y | -5.57 | Z | 5.57 |
|---|---|---|---|---|---|
| α | 22.89 | β | 0.00 | γ | 0.00 |

Displacement and tilt(6)

| X | 0.00 | Y | -4.24 | Z | 5.22 |
|---|---|---|---|---|---|
| α | 22.89 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS① | | (1) | 1.5254 | 56.2 |
| 3 | FFS② | | (2) | 1.5254 | 56.2 |
| 4 | FFS③ | | (3) | 1.5254 | 56.2 |
| 5 | FFS④ | | (4) | 1.5254 | 56.2 |
| 6 | ∞ | | (5) | | |
| Image plane | ∞ | | (6) | | |

FFS①

| | | | | | |
|---|---|---|---|---|---|
| $C_4$ | $-2.8604 \times 10^{-2}$ | $C_6$ | $-8.2434 \times 10^{-3}$ | $C_8$ | $-1.1789 \times 10^{-3}$ |
| $C_{10}$ | $3.0266 \times 10^{-4}$ | $C_{11}$ | $1.3795 \times 10^{-3}$ | $C_{13}$ | $7.3602 \times 10^{-4}$ |
| $C_{15}$ | $-5.7068 \times 10^{-5}$ | | | | |

FFS②

| | | | | | |
|---|---|---|---|---|---|
| $C_4$ | $-4.6856 \times 10^{-3}$ | $C_6$ | $3.8356 \times 10^{-3}$ | $C_8$ | $-2.4166 \times 10^{-4}$ |
| $C_{10}$ | $-2.3753 \times 10^{-4}$ | $C_{11}$ | $4.1658 \times 10^{-4}$ | $C_{13}$ | $9.6865 \times 10^{-5}$ |
| $C_{15}$ | $5.0107 \times 10^{-6}$ | | | | |

FFS③

| | | | | | |
|---|---|---|---|---|---|
| $C_4$ | $-1.8828 \times 10^{-2}$ | $C_6$ | $-2.2522 \times 10^{-2}$ | $C_8$ | $1.8439 \times 10^{-4}$ |
| $C_{10}$ | $3.9616 \times 10^{-5}$ | $C_{11}$ | $-1.1708 \times 10^{-5}$ | $C_{13}$ | $-1.1528 \times 10^{-5}$ |
| $C_{15}$ | $-5.0867 \times 10^{-5}$ | | | | |

FFS④

| | | | | | |
|---|---|---|---|---|---|
| $C_4$ | $1.4421 \times 10^{-2}$ | $C_6$ | $3.9229 \times 10^{-3}$ | $C_8$ | $8.3738 \times 10^{-4}$ |
| $C_{10}$ | $5.4482 \times 10^{-4}$ | $C_{11}$ | $2.8290 \times 10^{-5}$ | $C_{13}$ | $8.2023 \times 10^{-5}$ |
| $C_{15}$ | $7.6549 \times 10^{-6}$ | | | | |

Displacement and tilt(1)

| X | 0.00 | Y | 0.00 | Z | 0.01 |
|---|---|---|---|---|---|
| α | 0.00 | β | 0.00 | γ | 0.00 |

Displacement and tilt(2)

| X | 0.00 | Y | 0.00 | Z | 1.58 |
|---|---|---|---|---|---|
| α | 50.54 | β | 0.00 | γ | 0.00 |

Displacement and tilt(3)

| X | 0.00 | Y | -9.47 | Z | 3.43 |
|---|---|---|---|---|---|
| α | -53.52 | β | 0.00 | γ | 0.00 |

-continued

| | | Displacement and tilt(4) | | | |
|---|---|---|---|---|---|
| X | 0.00 | Y | −7.28 | Z | −0.67 |
| α | −1.56 | β | 0.00 | γ | 0.00 |
| | | Displacement and tilt(5) | | | |
| X | 0.00 | Y | −4.31 | Z | 5.70 |
| α | 25.02 | β | 0.00 | γ | 0.00 |
| | | Displacement and tilt(6) | | | |
| X | 0.00 | Y | −4.22 | Z | 5.88 |
| α | 25.02 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | −22.69 | | (1) | 1.5254 | 56.2 |
| 3 | FFS① | | (2) | 1.5254 | 56.2 |
| 4 | FFS② | | (3) | 1.5254 | 56.2 |
| 5 | ASS① | | (4) | 1.5254 | 56.2 |
| 6 | ∞ | | (5) | | |
| Image plane | ∞ | | (6) | | |

ASS①

| R | 34.14 |
|---|---|
| K | 0.0000 |
| A | $4.8693 \times 10^{-5}$ |
| B | $-6.0930 \times 10^{-7}$ |

FFS①

| $C_4$ | $-2.8401 \times 10^{-3}$ | $C_6$ | $-4.6281 \times 10^{-4}$ | $C_8$ | $-7.1500 \times 10^{-4}$ |
| $C_{10}$ | $-2.5278 \times 10^{-4}$ | $C_{11}$ | $1.9439 \times 10^{-4}$ | $C_{13}$ | $-1.3439 \times 10^{-5}$ |
| $C_{15}$ | $6.8200 \times 10^{-6}$ | | | | |

FFS②

| $C_4$ | $-1.7842 \times 10^{-2}$ | $C_6$ | $-1.3733 \times 10^{-2}$ | $C_8$ | $-4.6091 \times 10^{-4}$ |
| $C_{10}$ | $-4.5907 \times 10^{-4}$ | $C_{11}$ | $8.3782 \times 10^{-7}$ | $C_{13}$ | $1.2077 \times 10^{-5}$ |
| $C_{15}$ | $3.6142 \times 10^{-6}$ | | | | |

Displacement and tilt(1)

| X | 0.00 | Y | 0.00 | Z | 0.02 |
|---|---|---|---|---|---|
| α | 0.00 | β | 0.00 | γ | 0.00 |

Displacement and tilt(2)

| X | 0.00 | Y | 0.00 | Z | 1.57 |
|---|---|---|---|---|---|
| α | 50.02 | β | 0.00 | γ | 0.00 |

Displacement and tilt(3)

| X | 0.00 | Y | −9.38 | Z | 3.23 |
|---|---|---|---|---|---|
| α | −54.12 | β | 0.00 | γ | 0.00 |

Displacement and tilt(4)

| X | 0.00 | Y | −7.15 | Z | −0.91 |
|---|---|---|---|---|---|
| α | −2.71 | β | 0.00 | γ | 0.00 |

Displacement and tilt(5)

| X | 0.00 | Y | −4.47 | Z | 5.44 |
|---|---|---|---|---|---|
| α | 22.88 | β | 0.00 | γ | 0.00 |

Displacement and tilt(6)

| X | 0.00 | Y | −4.28 | Z | 5.90 |
|---|---|---|---|---|---|
| α | 22.88 | β | 0.00 | γ | 0.00 |

EXAMPLE 4

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | −108.73 | | (1) | 1.5254 | 56.2 |
| 3 | ASS① | | (2) | 1.5254 | 56.2 |
| 4 | FFS① | | (3) | 1.5254 | 56.2 |
| 5 | ASS② | | (4) | 1.5254 | 56.2 |
| 6 | ∞ | | (5) | | |
| Image plane | ∞ | | (6) | | |

ASS①

| R | −612.15 |
|---|---|
| K | 0.0000 |
| A | $2.4308 \times 10^{-4}$ |
| B | $-2.6464 \times 10^{-5}$ |

ASS②

| R | 35.55 |
|---|---|
| K | 0.0000 |
| A | $3.3593 \times 10^{-5}$ |
| B | $-5.5661 \times 10^{-7}$ |

FFS①

| $C_4$ | $-1.6502 \times 10^{-2}$ | $C_6$ | $-1.1486 \times 10^{-2}$ | $C_8$ | $-3.9715 \times 10^{-4}$ |
| $C_{10}$ | $-3.8604 \times 10^{-4}$ | $C_{11}$ | $-4.5904 \times 10^{-7}$ | $C_{13}$ | $-8.4324 \times 10^{-6}$ |
| $C_{15}$ | $-6.9965 \times 10^{-6}$ | | | | |

Displacement and tilt(1)

| X | 0.00 | Y | 0.00 | Z | 0.00 |
|---|---|---|---|---|---|
| α | 0.00 | β | 0.00 | γ | 0.00 |

Displacement and tilt(2)

| X | 0.00 | Y | 0.00 | Z | 1.57 |
|---|---|---|---|---|---|
| α | 49.99 | β | 0.00 | γ | 0.00 |

Displacement and tilt(3)

| X | 0.00 | Y | −10.44 | Z | 3.40 |
|---|---|---|---|---|---|
| α | −54.54 | β | 0.00 | γ | 0.00 |

Displacement and tilt(4)

| X | 0.00 | Y | −8.05 | Z | −0.89 |
|---|---|---|---|---|---|
| α | −2.88 | β | 0.00 | γ | 0.00 |

Displacement and tilt(5)

| X | 0.00 | Y | −5.35 | Z | 5.39 |
|---|---|---|---|---|---|
| α | 23.14 | β | 0.00 | γ | 0.00 |

Displacement and tilt(6)

| X | 0.00 | Y | −5.15 | Z | 5.85 |
|---|---|---|---|---|---|
| α | 23.14 | β | 0.00 | γ | 0.00 |

EXAMPLE 5

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | −7.59 | | (1) | 1.5254 | 56.2 |
| 3 | FFS① | | (2) | 1.5254 | 56.2 |
| 4 | FFS② | | (3) | 1.5254 | 56.2 |
| 5 | FFS③ | | (4) | 1.5254 | 56.2 |
| 6 | ∞ | | (5) | | |
| Image plane | | | (6) | | |

-continued

FFS①

| | | | | | |
|---|---|---|---|---|---|
| $C_4$ | $-4.1999 \times 10^{-3}$ | $C_6$ | $-3.5807 \times 10^{-4}$ | $C_8$ | $-2.3099 \times 10^{-5}$ |
| $C_{10}$ | $-7.0001 \times 10^{-5}$ | $C_{11}$ | $2.6858 \times 10^{-4}$ | $C_{13}$ | $2.4515 \times 10^{-4}$ |
| $C_{15}$ | $-3.8114 \times 10^{-5}$ | | | | |

FFS②

| | | | | | |
|---|---|---|---|---|---|
| $C_4$ | $-1.5919 \times 10^{-2}$ | $C_6$ | $-1.5752 \times 10^{-2}$ | $C_8$ | $6.5926 \times 10^{-5}$ |
| $C_{10}$ | $-4.0983 \times 10^{-5}$ | $C_{11}$ | $1.0440 \times 10^{-5}$ | $C_{13}$ | $-6.1805 \times 10^{-5}$ |
| $C_{15}$ | $4.3638 \times 10^{-5}$ | | | | |

FFS③

| | | | | | |
|---|---|---|---|---|---|
| $C_4$ | $1.1587 \times 10^{-2}$ | $C_6$ | $8.8734 \times 10^{-3}$ | $C_8$ | $3.7748 \times 10^{-4}$ |
| $C_{10}$ | $2.1598 \times 10^{-4}$ | $C_{11}$ | $3.7788 \times 10^{-5}$ | $C_{13}$ | $-5.5970 \times 10^{-5}$ |
| $C_{15}$ | $9.1245 \times 10^{-5}$ | | | | |

Displacement and tilt(1)

| | | | | | |
|---|---|---|---|---|---|
| X | 0.00 | Y | 0.00 | Z | 0.06 |
| α | 0.00 | β | 0.00 | γ | 0.00 |

Displacement and tilt(2)

| | | | | | |
|---|---|---|---|---|---|
| X | 0.00 | Y | 0.00 | Z | 1.63 |
| α | 51.16 | β | 0.00 | γ | 0.00 |

Displacement and tilt(3)

| | | | | | |
|---|---|---|---|---|---|
| X | 0.00 | Y | −11.08 | Z | 4.05 |
| α | −58.24 | β | 0.00 | γ | 0.00 |

Displacement and tilt(4)

| | | | | | |
|---|---|---|---|---|---|
| X | 0.00 | Y | −6.04 | Z | −2.21 |
| α | −18.97 | β | 0.00 | γ | 0.00 |

Displacement and tilt(5)

| | | | | | |
|---|---|---|---|---|---|
| X | 0.00 | Y | −5.89 | Z | 7.64 |
| α | 0.00 | β | 0.00 | γ | 0.00 |

Displacement and tilt(6)

| | | | | | |
|---|---|---|---|---|---|
| X | 0.00 | Y | −5.88 | Z | 8.14 |
| α | 0.00 | β | 0.00 | γ | 0.00 |

EXAMPLE 6

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | ∞ | | (1) | 1.5254 | 56.2 |
| 3 | FFS① | | (2) | 1.5254 | 56.2 |
| 4 | FFS② | | (3) | 1.5254 | 56.2 |
| 5 | FFS③ | | (4) | 1.5254 | 56.2 |
| 6 | FFS① | | (2) | | |
| Image plane | ∞ | | (5) | | |

FFS①

| | | | | | |
|---|---|---|---|---|---|
| $C_4$ | $-5.9679 \times 10^{-3}$ | $C_6$ | $2.4019 \times 10^{-4}$ | $C_8$ | $-3.8330 \times 10^{-4}$ |
| $C_{10}$ | $-1.1222 \times 10^{-4}$ | $C_{11}$ | $1.4163 \times 10^{-4}$ | $C_{13}$ | $2.8257 \times 10^{-5}$ |
| $C_{15}$ | $1.4983 \times 10^{-7}$ | | | | |

FFS②

| | | | | | |
|---|---|---|---|---|---|
| $C_4$ | $-2.2992 \times 10^{-2}$ | $C_6$ | $-2.3681 \times 10^{-2}$ | $C_8$ | $2.1962 \times 10^{-4}$ |
| $C_{10}$ | $2.1918 \times 10^{-4}$ | $C_{11}$ | $-1.9363 \times 10^{-5}$ | $C_{13}$ | $-5.9631 \times 10^{-5}$ |
| $C_{15}$ | $-8.9282 \times 10^{-5}$ | | | | |

FFS③

| | | | | | |
|---|---|---|---|---|---|
| $C_4$ | $1.1980 \times 10^{-2}$ | $C_6$ | $4.0025 \times 10^{-3}$ | $C_8$ | $1.0101 \times 10^{-3}$ |
| $C_{10}$ | $8.7909 \times 10^{-4}$ | $C_{11}$ | $1.5009 \times 10^{-5}$ | $C_{13}$ | $5.5050 \times 10^{-5}$ |
| $C_{15}$ | $3.1295 \times 10^{-5}$ | | | | |

Displacement and tilt(1)

| | | | | | |
|---|---|---|---|---|---|
| X | 0.00 | Y | 0.00 | Z | 0.00 |
| α | 0.00 | β | 0.00 | γ | 0.00 |

Displacement and tilt(2)

| | | | | | |
|---|---|---|---|---|---|
| X | 0.00 | Y | 0.00 | Z | 2.21 |
| α | 58.51 | β | 0.00 | γ | 0.00 |

Displacement and tilt(3)

| | | | | | |
|---|---|---|---|---|---|
| X | 0.00 | Y | −5.15 | Z | 4.83 |
| α | −37.71 | β | 0.00 | γ | 0.00 |

Displacement and tilt(4)

| | | | | | |
|---|---|---|---|---|---|
| X | 0.00 | Y | −4.29 | Z | 0.91 |
| α | 23.06 | β | 0.00 | γ | 0.00 |

Displacement and tilt(5)

| | | | | | |
|---|---|---|---|---|---|
| X | 0.00 | Y | −0.16 | Z | 3.43 |
| α | 58.59 | β | 0.00 | γ | 0.00 |

EXAMPLE 7

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS① | | (1) | 1.5254 | 56.2 |
| 3 | FFS② | | (2) | 1.5254 | 56.2 |
| 4 | FFS③ | | (3) | 1.5254 | 56.2 |
| 5 | FFS④ | | (4) | 1.5254 | 56.2 |
| 6 | FFS② | | (2) | | |
| Image plane | ∞ | | (5) | | |

FFS①

| | | | | | |
|---|---|---|---|---|---|
| $C_4$ | $6.4229 \times 10^{-3}$ | $C_6$ | $2.3844 \times 10^{-3}$ | $C_8$ | $-2.1315 \times 10^{-3}$ |
| $C_{10}$ | $2.3072 \times 10^{-3}$ | $C_{11}$ | $3.2942 \times 10^{-4}$ | $C_{13}$ | $-5.1480 \times 10^{-4}$ |
| $C_{15}$ | $1.6767 \times 10^{-4}$ | | | | |

FFS②

| | | | | | |
|---|---|---|---|---|---|
| $C_4$ | $-5.5298 \times 10^{-3}$ | $C_6$ | $1.3334 \times 10^{-4}$ | $C_8$ | $-5.3766 \times 10^{-4}$ |
| $C_{10}$ | $5.1448 \times 10^{-5}$ | $C_{11}$ | $1.9177 \times 10^{-4}$ | $C_{13}$ | $6.4722 \times 10^{-6}$ |
| $C_{15}$ | $1.3621 \times 10^{-6}$ | | | | |

FFS③

| | | | | | |
|---|---|---|---|---|---|
| $C_4$ | $-2.3007 \times 10^{-2}$ | $C_6$ | $2.5359 \times 10^{-2}$ | $C_8$ | $2.2390 \times 10^{-4}$ |
| $C_{10}$ | $6.6366 \times 10^{-4}$ | $C_{11}$ | $-1.4415 \times 10^{-5}$ | $C_{13}$ | $-1.1004 \times 10^{-4}$ |
| $C_{15}$ | $-3.1372 \times 10^{-5}$ | | | | |

FFS④

| | | | | | |
|---|---|---|---|---|---|
| $C_4$ | $1.1579 \times 10^{-2}$ | $C_6$ | $1.2198 \times 10^{-3}$ | $C_8$ | $1.0524 \times 10^{-3}$ |
| $C_{10}$ | $1.2232 \times 10^{-3}$ | $C_{11}$ | $1.6014 \times 10^{-5}$ | $C_{13}$ | $-1.3136 \times 10^{-5}$ |
| $C_{15}$ | $1.1966 \times 10^{-4}$ | | | | |

Displacement and tilt(1)

| | | | | | |
|---|---|---|---|---|---|
| X | 0.00 | Y | 0.00 | Z | 0.00 |
| α | 0.00 | β | 0.00 | γ | 0.00 |

Displacement and tilt(2)

| | | | | | |
|---|---|---|---|---|---|
| X | 0.00 | Y | 0.00 | Z | 2.11 |
| α | 59.64 | β | 0.00 | γ | 0.00 |

Displacement and tilt(3)

| | | | | | |
|---|---|---|---|---|---|
| X | 0.00 | Y | −5.07 | Z | 4.95 |
| α | −36.60 | β | 0.00 | γ | 0.00 |

Displacement and tilt(4)

| | | | | | |
|---|---|---|---|---|---|
| X | 0.00 | Y | −4.23 | Z | 1.15 |
| α | 23.57 | β | 0.00 | γ | 0.00 |

-continued

| | Displacement and tilt(5) | | | | | |
|---|---|---|---|---|---|---|
| X | 0.00 | Y | −0.23 | Z | 3.49 |
| α | 59.63 | β | 0.00 | γ | 0.00 |

EXAMPLE 8

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS① | | (1) | 1.5254 | 56.2 |
| 3 | ∞ | | (2) | 1.5254 | 56.2 |
| 4 | FFS② | | (3) | 1.5254 | 56.2 |
| 5 | FFS③ | | (4) | 1.5254 | 56.2 |
| 6 | ∞ | | (2) | | |
| Image plane | ∞ | | (5) | | |

FFS①

| $C_4$ | −4.0886 × 10$^{-3}$ | $C_6$ | −2.1173 × 10$^{-2}$ | $C_8$ | 2.0808 × 10$^{-3}$ |
| $C_{10}$ | 2.5747 × 10$^{-3}$ | $C_{11}$ | −2.6038 × 10$^{-4}$ | $C_{13}$ | −1.3110 × 10$^{-3}$ |
| $C_{15}$ | −7.5816 × 10$^{-5}$ | | | | |

FFS②

| $C_4$ | −2.3709 × 10$^{-2}$ | $C_6$ | −2.5799 × 10$^{-2}$ | $C_8$ | −9.7990 × 10$^{-5}$ |
| $C_{10}$ | 2.1528 × 10$^{-4}$ | $C_{11}$ | −1.5683 × 10$^{-5}$ | $C_{13}$ | −9.2260 × 10$^{-5}$ |
| $C_{15}$ | −6.1702 × 10$^{-5}$ | | | | |

FFS③

| $C_4$ | 1.0474 × 10$^{-2}$ | $C_6$ | −5.4930 × 10$^{-4}$ | $C_8$ | 7.3001 × 10$^{-4}$ |
| $C_{10}$ | 4.8564 × 10$^{-4}$ | $C_{11}$ | 1.8197 × 10$^{-5}$ | $C_{13}$ | −9.0325 × 10$^{-6}$ |
| $C_{15}$ | 2.8638 × 10$^{-5}$ | | | | |

| | Displacement and tilt(1) | | | | | |
|---|---|---|---|---|---|---|
| X | 0.00 | Y | 0.00 | Z | 0.02 |
| α | 0.00 | β | 0.00 | γ | 0.00 |
| | Displacement and tilt(2) | | | | | |
| X | 0.00 | Y | 0.00 | Z | 2.24 |
| α | 61.25 | β | 0.00 | γ | 0.00 |
| | Displacement and tilt(3) | | | | | |
| X | 0.00 | Y | −5.81 | Z | 5.94 |
| α | −37.11 | β | 0.00 | γ | 0.00 |
| | Displacement and tilt(4) | | | | | |
| X | 0.00 | Y | −4.45 | Z | 1.43 |
| α | 25.57 | β | 0.00 | γ | 0.00 |
| | Displacement and tilt(5) | | | | | |
| X | 0.00 | Y | 0.40 | Z | 3.34 |
| α | 72.21 | β | 0.00 | γ | 0.00 |

EXAMPLE 9

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | ∞ | | (1) | 1.5254 | 56.2 |
| 3 | FFS① | | (2) | 1.5254 | 56.2 |
| 4 | −21.28 | | (3) | 1.5254 | 56.2 |
| 5 | FFS② | | (4) | 1.5254 | 56.2 |
| 6 | ∞ | | (2) | | |
| Image plane | ∞ | | (5) | | |

FFS①

| $C_4$ | −5.0524 × 10$^{-3}$ | $C_6$ | 7.7975 × 10$^{-5}$ | $C_8$ | −4.6499 × 10$^{-4}$ |
| $C_{10}$ | −1.0056 × 10$^{-4}$ | $C_{11}$ | 8.5596 × 10$^{-5}$ | $C_{13}$ | 1.3645 × 10$^{-5}$ |
| $C_{15}$ | −9.0784 × 10$^{-6}$ | | | | |

FFS②

| $C_4$ | 1.1555 × 10$^{-2}$ | $C_6$ | 4.3107 × 10$^{-3}$ | $C_8$ | 7.2247 × 10$^{-4}$ |
| $C_{10}$ | 5.7015 × 10$^{-4}$ | $C_{11}$ | −1.2252 × 10$^{-5}$ | $C_{13}$ | 1.0965 × 10$^{-4}$ |
| $C_{15}$ | 9.5912 × 10$^{-5}$ | | | | |

| | Displacement and tilt(1) | | | | | |
|---|---|---|---|---|---|---|
| X | 0.00 | Y | 0.00 | Z | 0.00 |
| α | 0.00 | β | 0.00 | γ | 0.00 |
| | Displacement and tilt(2) | | | | | |
| X | 0.00 | Y | 0.00 | Z | 2.15 |
| α | 60.28 | β | 0.00 | γ | 0.00 |
| | Displacement and tilt(3) | | | | | |
| X | 0.00 | Y | −5.22 | Z | 5.23 |
| α | −36.09 | β | 0.00 | γ | 0.00 |
| | Displacement and tilt(4) | | | | | |
| X | 0.00 | Y | −4.31 | Z | 1.22 |
| α | 24.46 | β | 0.00 | γ | 0.00 |
| | Displacement and tilt(5) | | | | | |
| X | 0.00 | Y | −0.09 | Z | 3.48 |
| α | 62.55 | β | 0.00 | γ | 0.00 |

EXAMPLE 10

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS① | | (1) | 1.5254 | 56.2 |
| 3 | ∞ | | (2) | 1.5254 | 56.2 |
| 4 | −21.90 | | (3) | 1.5254 | 56.2 |
| 5 | FFS② | | (4) | 1.5254 | 56.2 |
| 6 | ∞ | | (2) | | |
| Image plane | ∞ | | (5) | | |

FFS①

| $C_4$ | 2.7171 × 10$^{-3}$ | $C_6$ | −1.2638 × 10$^{-2}$ | $C_8$ | 1.3368 × 10$^{-3}$ |
| $C_{10}$ | 2.2565 × 10$^{-3}$ | $C_{11}$ | −1.9146 × 10$^{-4}$ | $C_{13}$ | −9.1613 × 10$^{-4}$ |
| $C_{15}$ | 1.5462 × 10$^{-4}$ | | | | |

FFS②

| $C_4$ | 1.0790 × 10$^{-2}$ | $C_6$ | 2.8634 × 10$^{-3}$ | $C_8$ | 7.8451 × 10$^{-4}$ |
| $C_{10}$ | 3.5327 × 10$^{-4}$ | $C_{11}$ | 1.9617 × 10$^{-7}$ | $C_{13}$ | 5.6526 × 10$^{-5}$ |
| $C_{15}$ | 4.9131 × 10$^{-5}$ | | | | |

| | Displacement and tilt(1) | | | | | |
|---|---|---|---|---|---|---|
| X | 0.00 | Y | 0.00 | Z | 0.01 |
| α | 0.00 | β | 0.00 | γ | 0.00 |
| | Displacement and tilt(2) | | | | | |
| X | 0.00 | Y | 0.00 | Z | 2.24 |
| α | 61.27 | β | 0.00 | γ | 0.00 |
| | Displacement and tilt(3) | | | | | |
| X | 0.00 | Y | −5.60 | Z | 5.81 |
| α | −35.94 | β | 0.00 | γ | 0.00 |

-continued

| | | Displacement and tilt(4) | | | | |
|---|---|---|---|---|---|---|
| X | 0.00 | Y | −4.47 | Z | 1.41 | |
| α | 26.13 | β | 0.00 | γ | 0.00 | |
| | | Displacement and tilt(5) | | | | |
| X | 0.00 | Y | 0.31 | Z | 3.43 | |
| α | 70.80 | β | 0.00 | γ | 0.00 | |

EXAMPLE 11

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS① | | (1) | 1.5254 | 56.2 |
| 3 | FFS② | | (2) | 1.5254 | 56.2 |
| 4 | FFS③ | | (3) | 1.5254 | 56.2 |
| 5 | FFS④ | | (4) | 1.5254 | 56.2 |
| 6 | FFS⑤ | | (5) | | |
| Image plane | ∞ | | (6) | | |

FFS①

| $C_4$ | $-8.9127 \times 10^{-2}$ | $C_6$ | $-9.5356 \times 10^{-2}$ | $C_8$ | $-3.5793 \times 10^{-3}$ |
| $C_{10}$ | $-4.0456 \times 10^{-3}$ | $C_{11}$ | $-1.9833 \times 10^{-4}$ | $C_{13}$ | $-4.4235 \times 10^{-3}$ |

FFS②

| $C_4$ | $-1.0381 \times 10^{-2}$ | $C_6$ | $-1.1052 \times 10^{-2}$ | $C_8$ | $-2.1578 \times 10^{-4}$ |
| $C_{10}$ | $-1.5722 \times 10^{-4}$ | $C_{11}$ | $9.6190 \times 10^{-6}$ | $C_{13}$ | $-6.0980 \times 10^{-6}$ |

FFS③

| $C_4$ | $7.7051 \times 10^{-3}$ | $C_6$ | $4.6995 \times 10^{-3}$ | $C_8$ | $-1.5114 \times 10^{-4}$ |
| $C_{10}$ | $-8.3040 \times 10^{-5}$ | $C_{11}$ | $1.1415 \times 10^{-5}$ | $C_{13}$ | $-6.5985 \times 10^{-6}$ |

FFS④

| $C_4$ | $2.1221 \times 10^{-3}$ | $C_6$ | $2.5841 \times 10^{-4}$ | $C_8$ | $-1.0538 \times 10^{-4}$ |
| $C_{10}$ | $-2.2873 \times 10^{-5}$ | $C_{11}$ | $2.0472 \times 10^{-5}$ | $C_{13}$ | $-5.9609 \times 10^{-6}$ |

FFS⑤

| $C_4$ | $7.0082 \times 10^{-2}$ | $C_6$ | $5.8372 \times 10^{-2}$ | $C_8$ | $7.8413 \times 10^{-4}$ |
| $C_{10}$ | $6.7075 \times 10^{-4}$ | $C_{11}$ | $6.9278 \times 10^{-4}$ | $C_{13}$ | $5.5357 \times 10^{-5}$ |

| | | Displacement and tilt(1) | | | |
|---|---|---|---|---|---|
| X | 0.00 | Y | 0.00 | Z | 0.96 |
| α | −3.00 | β | 0.00 | γ | 0.00 |
| | | Displacement and tilt(2) | | | |
| X | 0.00 | Y | −0.32 | Z | 18.85 |
| α | 14.30 | β | 0.00 | γ | 0.00 |
| | | Displacement and tilt(3) | | | |
| X | 0.00 | Y | −6.61 | Z | 7.80 |
| α | 55.73 | β | 0.00 | γ | 0.00 |
| | | Displacement and tilt(4) | | | |
| X | 0.00 | Y | 10.31 | Z | 10.23 |
| α | −43.40 | β | 0.00 | γ | 0.00 |
| | | Displacement and tilt(5) | | | |
| X | 0.00 | Y | 11.42 | Z | 15.78 |
| α | 13.26 | β | 0.00 | γ | 0.00 |
| | | Displacement and tilt(6) | | | |
| X | 0.00 | Y | 11.68 | Z | 17.19 |
| α | 10.37 | β | 0.00 | γ | 0.00 |

EXAMPLE 12

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS① | | (1) | 1.5254 | 56.2 |
| 3 | FFS② | | (2) | 1.5254 | 56.2 |
| 4 | FFS③ | | (3) | 1.5254 | 56.2 |
| 5 | FFS④ | | (4) | 1.5254 | 56.2 |
| 6 | FFS⑤ | | (5) | | |
| Image plane | ∞ | | (6) | | |

FFS①

| $C_4$ | $-7.9211 \times 10^{-2}$ | $C_6$ | $-1.0146 \times 10^{-1}$ | $C_8$ | $2.4534 \times 10^{-3}$ |
| $C_{10}$ | $-2.0643 \times 10^{-3}$ | $C_{11}$ | $-9.3114 \times 10^{-4}$ | $C_{13}$ | $-2.4386 \times 10^{-3}$ |

FFS②

| $C_4$ | $-1.1469 \times 10^{-2}$ | $C_6$ | $-1.3911 \times 10^{-2}$ | $C_8$ | $2.6114 \times 10^{-4}$ |
| $C_{10}$ | $-2.3753 \times 10^{-4}$ | $C_{11}$ | $-1.8850 \times 10^{-6}$ | $C_{13}$ | $7.9076 \times 10^{-6}$ |

FFS③

| $C_4$ | $1.1485 \times 10^{-2}$ | $C_6$ | $5.7073 \times 10^{-3}$ | $C_8$ | $4.7344 \times 10^{-4}$ |
| $C_{10}$ | $-1.2553 \times 10^{-4}$ | $C_{11}$ | $5.8436 \times 10^{-6}$ | $C_{13}$ | $5.9345 \times 10^{-6}$ |

FFS④

| $C_4$ | $5.8635 \times 10^{-3}$ | $C_6$ | $6.9275 \times 10^{-3}$ | $C_8$ | $1.0101 \times 10^{-3}$ |
| $C_{10}$ | $4.0640 \times 10^{-5}$ | $C_{11}$ | $2.5761 \times 10^{-5}$ | $C_{13}$ | $5.0653 \times 10^{-6}$ |

FFS⑤

| $C_4$ | $-1.7625 \times 10^{-2}$ | $C_6$ | $3.7708 \times 10^{-2}$ | $C_8$ | $2.2953 \times 10^{-3}$ |
| $C_{10}$ | $1.3909 \times 10^{-3}$ | $C_{11}$ | $-6.1893 \times 10^{-5}$ | $C_{13}$ | $-4.3469 \times 10^{-4}$ |

| | | Displacement and tilt(1) | | | |
|---|---|---|---|---|---|
| X | 0.00 | Y | 0.00 | Z | 0.94 |
| α | −0.36 | β | 0.00 | γ | 0.00 |
| | | Displacement and tilt(2) | | | |
| X | 0.00 | Y | −0.03 | Z | 13.57 |
| α | 18.76 | β | 0.00 | γ | 0.00 |
| | | Displacement and tilt(3) | | | |
| X | 0.00 | Y | −4.72 | Z | 7.48 |
| α | 69.26 | β | 0.00 | γ | 0.00 |
| | | Displacement and tilt(4) | | | |
| X | 0.00 | Y | 8.98 | Z | 4.85 |
| α | 55.93 | β | 0.00 | γ | 0.00 |
| | | Displacement and tilt(5) | | | |
| X | 0.00 | Y | 7.93 | Z | −0.55 |
| α | 6.53 | β | 0.00 | γ | 0.00 |
| | | Displacement and tilt(6) | | | |
| X | 0.00 | Y | 7.81 | Z | −1.03 |
| α | 13.34 | β | 0.00 | γ | 0.00 |

EXAMPLE 13

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS① | | (1) | 1.5254 | 56.2 |
| 3 | FFS② | | (2) | 1.5254 | 56.2 |
| 4 | FFS③ | | (3) | 1.5254 | 56.2 |
| 5 | FFS④ | | (4) | 1.5254 | 56.2 |
| 6 | FFS⑤ | | (5) | | |

-continued

| | | | | | |
|---|---|---|---|---|---|
| Image plane | $\infty$ | | (6) | | |

FFS①

| | | | | | |
|---|---|---|---|---|---|
| $C_4$ | $-6.7629 \times 10^{-3}$ | $C_6$ | $-7.5417 \times 10^{-2}$ | $C_8$ | $7.6012 \times 10^{-3}$ |
| $C_{10}$ | $-2.2552 \times 10^{-3}$ | $C_{11}$ | $-1.0100 \times 10^{-3}$ | $C_{13}$ | $-8.0963 \times 10^{-4}$ |

FFS②

| | | | | | |
|---|---|---|---|---|---|
| $C_4$ | $4.2258 \times 10^{-3}$ | $C_6$ | $-6.8525 \times 10^{-3}$ | $C_8$ | $1.4334 \times 10^{-3}$ |
| $C_{10}$ | $-5.8020 \times 10^{-5}$ | $C_{11}$ | $-1.8024 \times 10^{-4}$ | $C_{13}$ | $1.4204 \times 10^{-4}$ |

FFS③

| | | | | | |
|---|---|---|---|---|---|
| $C_4$ | $1.2370 \times 10^{-2}$ | $C_6$ | $9.4506 \times 10^{-3}$ | $C_8$ | $2.8709 \times 10^{-4}$ |
| $C_{10}$ | $2.6798 \times 10^{-4}$ | $C_{11}$ | $1.9467 \times 10^{-6}$ | $C_{13}$ | $1.8642 \times 10^{-5}$ |

FFS④

| | | | | | |
|---|---|---|---|---|---|
| $C_4$ | $-1.0905 \times 10^{-2}$ | $C_6$ | $-6.1974 \times 10^{-3}$ | $C_8$ | $-1.5764 \times 10^{-5}$ |
| $C_{10}$ | $7.3750 \times 10^{-5}$ | $C_{11}$ | $2.4054 \times 10^{-6}$ | $C_{13}$ | $2.0622 \times 10^{-5}$ |

FFS⑤

| | | | | | |
|---|---|---|---|---|---|
| $C_4$ | $-6.7856 \times 10^{-2}$ | $C_6$ | $-3.2508 \times 10^{-2}$ | $C_8$ | $-3.3933 \times 10^{-4}$ |
| $C_{10}$ | $-1.2625 \times 10^{-4}$ | $C_{11}$ | $-1.8800 \times 10^{-4}$ | $C_{13}$ | $2.7460 \times 10^{-5}$ |

Displacement and tilt(1)

| | | | | | |
|---|---|---|---|---|---|
| X | 0.00 | Y | 0.00 | Z | 0.93 |
| α | -0.02 | β | 0.00 | γ | 0.00 |

Displacement and tilt(2)

| | | | | | |
|---|---|---|---|---|---|
| X | 0.00 | Y | 0.00 | Z | 3.83 |
| α | 45.91 | β | 0.00 | γ | 0.00 |

Displacement and tilt(3)

| | | | | | |
|---|---|---|---|---|---|
| X | 0.00 | Y | -14.44 | Z | 4.29 |
| α | 64.81 | β | 0.00 | γ | 0.00 |

Displacement and tilt(4)

| | | | | | |
|---|---|---|---|---|---|
| X | 0.00 | Y | -9.99 | Z | 10.02 |
| α | 11.46 | β | 0.00 | γ | 0.00 |

Displacement and tilt(5)

| | | | | | |
|---|---|---|---|---|---|
| X | 0.00 | Y | -7.15 | Z | -0.67 |
| α | -17.68 | β | 0.00 | γ | 0.00 |

Displacement and tilt(6)

| | | | | | |
|---|---|---|---|---|---|
| X | 0.00 | Y | -6.87 | Z | -1.85 |
| α | -13.40 | β | 0.00 | γ | 0.00 |

EXAMPLE 14

| Surface No. | Radius of curvature | Surface separation | Displacement and tilt | Refractive index | Abbe's No. |
|---|---|---|---|---|---|
| Object plane | $\infty$ | $\infty$ | | | |
| 1 | $\infty$ (Stop) | | | | |
| 2 | FFS① | | (1) | 1.5254 | 56.2 |
| 3 | FFS② | | (2) | 1.5254 | 56.2 |
| 4 | FFS③ | | (3) | 1.5254 | 56.2 |
| 5 | FFS④ | | (4) | 1.5254 | 56.2 |
| 6 | $\infty$ | | (5) | | |
| Image plane | $\infty$ | | (6) | | |

FFS①

| | | | | | |
|---|---|---|---|---|---|
| $C_4$ | $-3.0124 \times 10^{-2}$ | $C_6$ | $2.9830 \times 10^{-3}$ | $C_7$ | $1.5193 \times 10^{-3}$ |
| $C_8$ | $-1.3685 \times 10^{-3}$ | $C_9$ | $2.9923 \times 10^{-3}$ | $C_{10}$ | $7.0950 \times 10^{-3}$ |
| $C_{11}$ | $2.2180 \times 10^{-3}$ | $C_{12}$ | $-1.0459 \times 10^{-3}$ | $C_{13}$ | $7.2719 \times 10^{-4}$ |
| $C_{14}$ | $1.4258 \times 10^{-3}$ | $C_{15}$ | $4.1441 \times 10^{-3}$ | | |

FFS②

| | | | | | |
|---|---|---|---|---|---|
| $C_4$ | $-2.2499 \times 10^{-4}$ | $C_6$ | $6.6561 \times 10^{-3}$ | $C_7$ | $6.3267 \times 10^{-4}$ |
| $C_8$ | $-9.4330 \times 10^{-5}$ | $C_9$ | $5.5101 \times 10^{-4}$ | $C_{10}$ | $7.1597 \times 10^{-4}$ |
| $C_{11}$ | $4.9038 \times 10^{-4}$ | $C_{12}$ | $-1.8192 \times 10^{-4}$ | $C_{13}$ | $3.9277 \times 10^{-4}$ |
| $C_{14}$ | $1.4359 \times 10^{-4}$ | $C_{15}$ | $1.1825 \times 10^{-4}$ | | |

FFS③

| | | | | | |
|---|---|---|---|---|---|
| $C_4$ | $1.4136 \times 10^{-2}$ | $C_6$ | $6.5846 \times 10^{-3}$ | $C_7$ | $1.9472 \times 10^{-6}$ |
| $C_8$ | $-1.3280 \times 10^{-4}$ | $C_9$ | $-6.1137 \times 10^{-5}$ | $C_{10}$ | $-4.0691 \times 10^{-4}$ |
| $C_{11}$ | $-1.1089 \times 10^{-5}$ | $C_{12}$ | $6.0764 \times 10^{-6}$ | $C_{13}$ | $7.8257 \times 10^{-5}$ |
| $C_{14}$ | $7.2012 \times 10^{-6}$ | $C_{15}$ | $2.8993 \times 10^{-7}$ | | |

FFS④

| | | | | | |
|---|---|---|---|---|---|
| $C_4$ | $-1.3495 \times 10^{-2}$ | $C_6$ | $-1.6500 \times 10^{-2}$ | $C_7$ | $2.2484 \times 10^{-5}$ |
| $C_8$ | $1.3196 \times 10^{-4}$ | $C_9$ | $-5.8042 \times 10^{-5}$ | $C_{10}$ | $-8.0432 \times 10^{-5}$ |
| $C_{11}$ | $-2.3096 \times 10^{-5}$ | $C_{12}$ | $4.6876 \times 10^{-6}$ | $C_{13}$ | $6.6176 \times 10^{-5}$ |
| $C_{14}$ | $6.1573 \times 10^{-6}$ | $C_{15}$ | $-1.1366 \times 10^{-5}$ | | |

Displacement and tilt(1)

| | | | | | |
|---|---|---|---|---|---|
| X | 0.00 | Y | 0.00 | Z | 0.00 |
| α | 0.00 | β | 0.00 | γ | 0.00 |

Displacement and tilt(2)

| | | | | | |
|---|---|---|---|---|---|
| X | 0.00 | Y | 0.00 | Z | 2.00 |
| α | 45.00 | β | 0.00 | γ | 0.00 |

Displacement and tilt(3)

| | | | | | |
|---|---|---|---|---|---|
| X | 0.00 | Y | -13.70 | Z | 2.00 |
| α | 90.00 | β | 21.82 | γ | 90.00 |

Displacement and tilt(4)

| | | | | | |
|---|---|---|---|---|---|
| X | -5.70 | Y | -7.72 | Z | 2.00 |
| α | 90.00 | β | 67.12 | γ | 90.00 |

Displacement and tilt(5)

| | | | | | |
|---|---|---|---|---|---|
| X | 5.54 | Y | -7.60 | Z | 2.00 |
| α | 0.00 | β | 89.76 | γ | 0.00 |

Displacement and tilt(6)

| | | | | | |
|---|---|---|---|---|---|
| X | 5.74 | Y | -7.60 | Z | 2.00 |
| α | 0.00 | β | 89.76 | γ | 90.00 |

Figure 9:
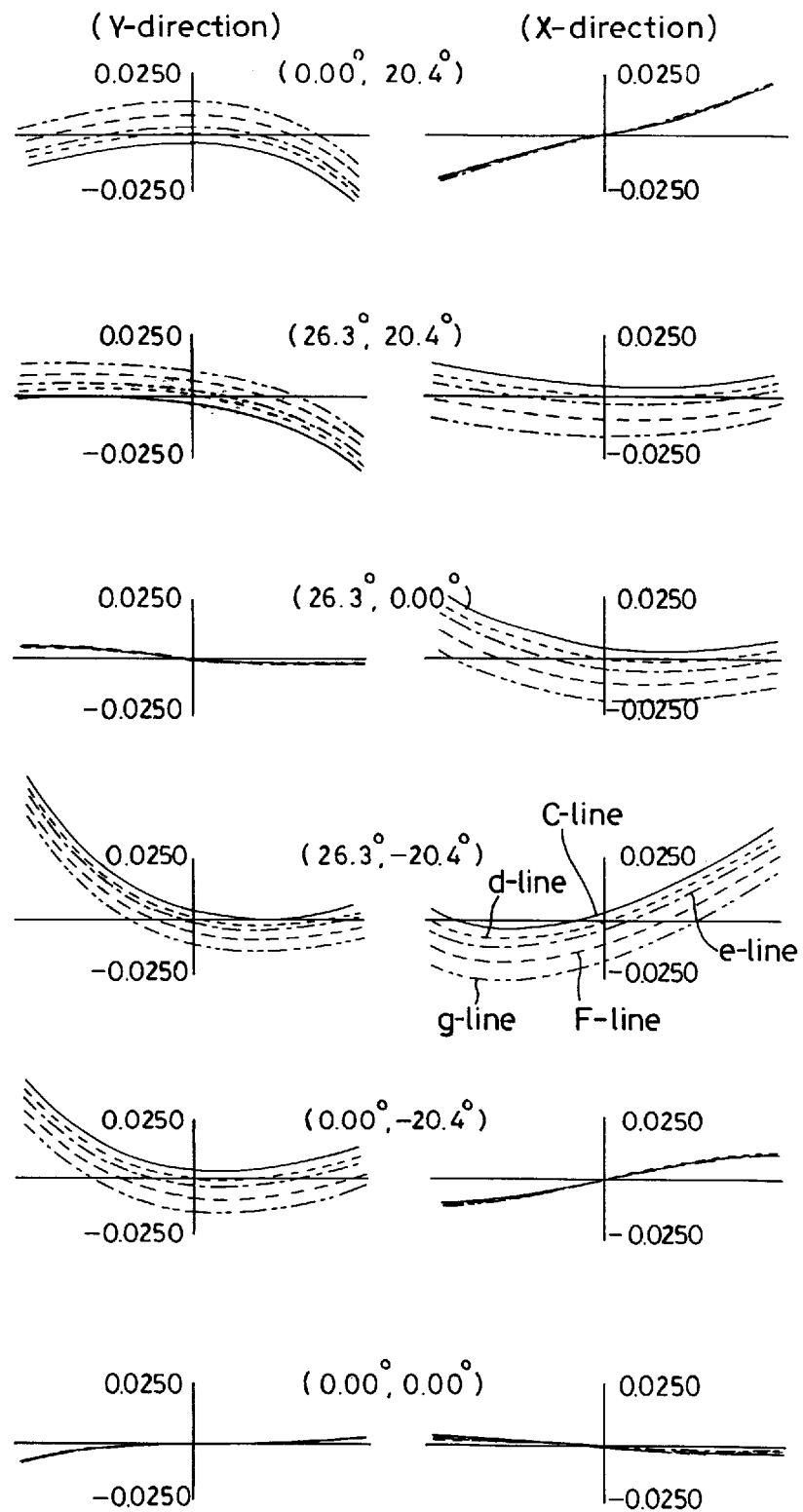
FIG. 9 is an aberrational diagram showing lateral aberrations in the image-forming optical system according to Example 2.
Figure 10:
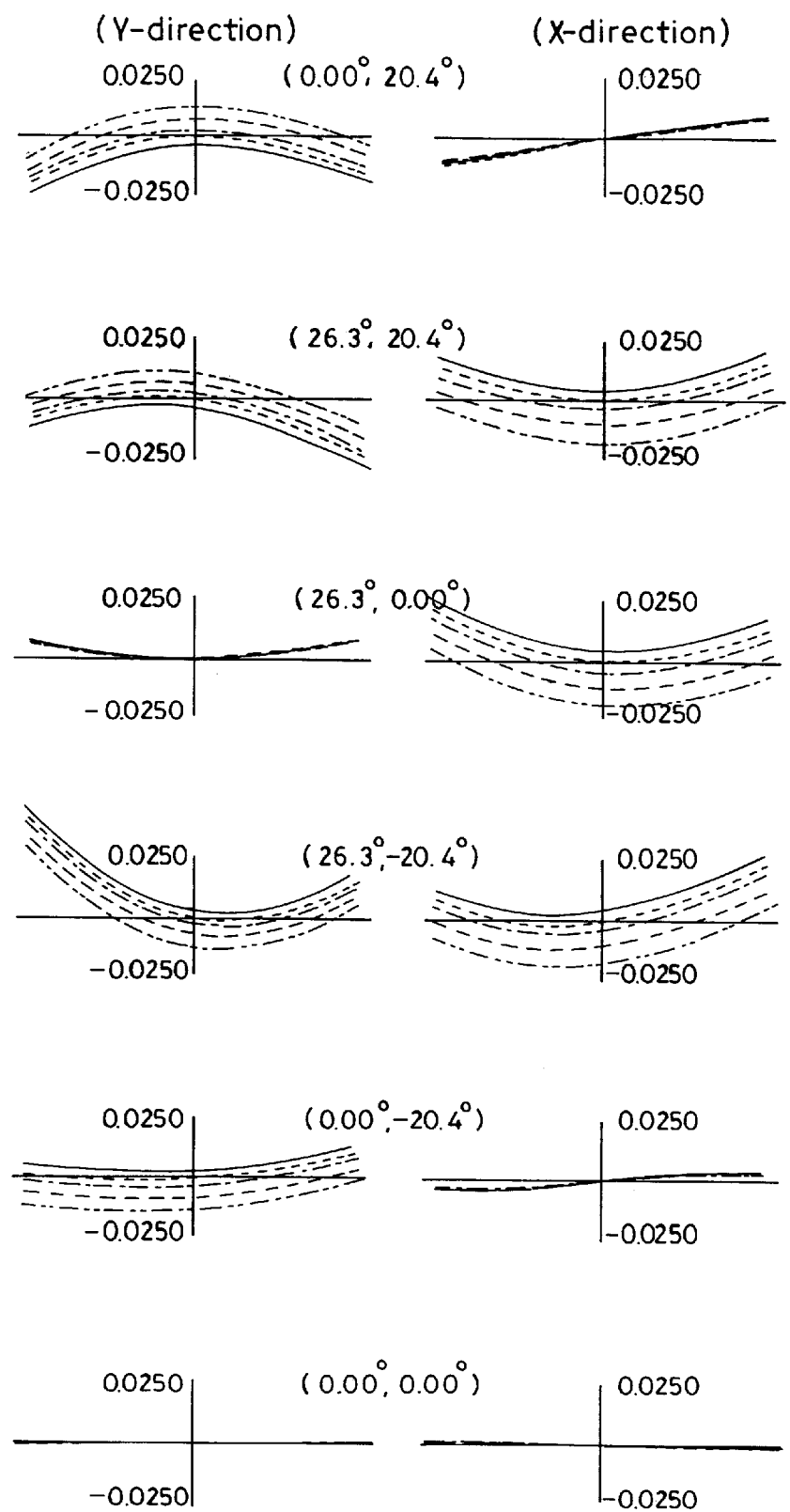
FIG. 10 is an aberrational diagram showing lateral aberrations in the image-forming optical system according to Example 7.

FIGS. 9 and 10 are aberrational diagrams showing lateral aberrations in the above-described Examples 2 and 7. In the diagrams showing lateral aberrations, the numerals in the parentheses denote [horizontal (X-direction) field angle, vertical (Y-direction) field angle], and lateral aberrations at the field angles are shown.

The values for θ, P2x/Px, P3x/Px, P2y/Py and P3y/Py concerning the conditions (1) to (8) in the above-described Examples 1 to 14 are as follows. It should be noted that the two values for θ are shown in order in which rays pass.

| | θ | P2x/Px | P3x/Px | P2y/Py | P3y/Py |
|---|---|---|---|---|---|
| Example 1 | 24.86 26.97 | 0.473 | 0.360 | 0.463 | 0.195 |
| Example 2 | 25.41 26.55 | 0.456 | 0.349 | 0.517 | 0.090 |
| Example 3 | 25.70 25.99 | 0.445 | 0.365 | 0.317 | 0.365 |
| Example 4 | 25.48 26.18 | 0.451 | 0.384 | 0.308 | 0.384 |
| Example 5 | 19.44 19.83 | 0.425 | 0.309 | 0.407 | 0.229 |
| Example 6 | 25.28 35.49 | 0.538 | 0.280 | 0.537 | 0.091 |
| Example 7 | 24.13 36.05 | 0.539 | 0.271 | 0.581 | 0.028 |
| Example 8 | 20.39 42.29 | 0.580 | 0.256 | 0.619 | -0.013 |
| Example 9 | 23.34 37.21 | 0.549 | 0.270 | 0.549 | 0.098 |

-continued

| | θ | P2x/Px | P3x/Px | P2y/Py | P3y/Py |
|---|---|---|---|---|---|
| Example 10 | 21.52 40.55 | 0.569 | 0.269 | 0.569 | 0.069 |
| Example 11 | 15.34 26.10 | 0.395 | 0.293 | 0.432 | 0.184 |
| Example 12 | 18.88 31.62 | 0.436 | 0.437 | 0.544 | 0.223 |
| Example 13 | 24.44 26.81 | 0.470 | 0.415 | 0.369 | 0.242 |
| Example 14 | 21.82 23.48 | 0.364 | 0.348 | 0.176 | 0.440 |

Incidentally, the above-described image-forming optical system according to the present invention can be used in photographic apparatus, particularly in cameras, in which an object image formed by the image-forming optical system is received with an image pickup device, such as a CCD or a silver halide film, to take a photograph of the object. It is also possible to use the image-forming optical system as an objective optical system of an observation apparatus in which an object image is viewed through an ocular lens, particularly a finder unit of a camera. The image-forming optical system according to the present invention is also usable as an image pickup optical system for optical apparatus using a small-sized image pickup device, e.g. endoscopes. Embodiments in which the present invention is applied to such apparatuses will be described below.

Figure 11:
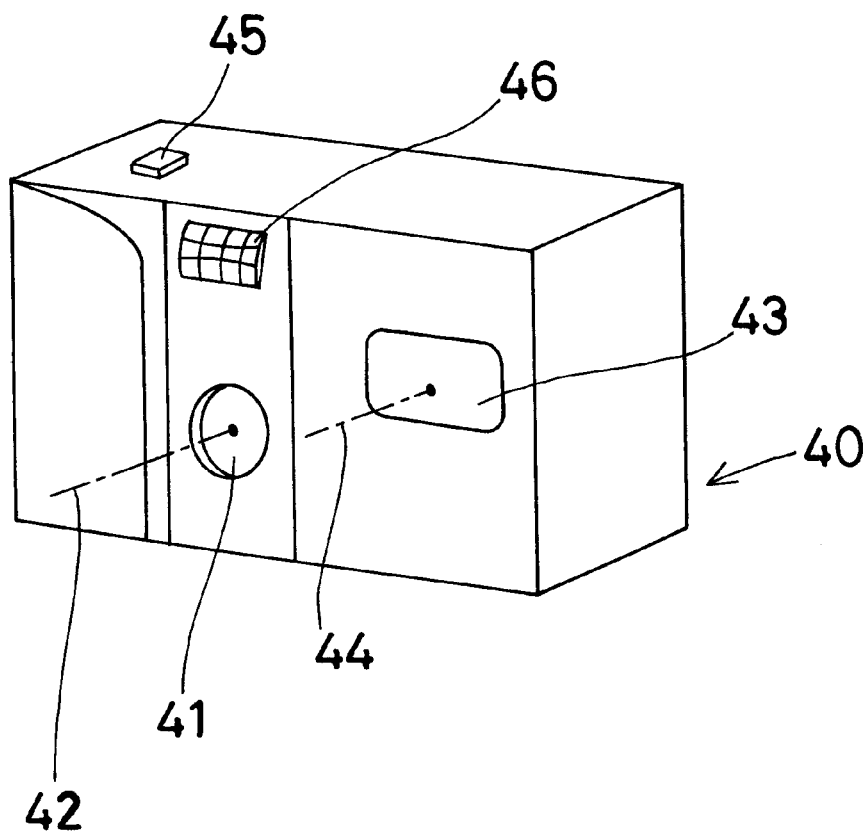
FIG. 11 is a perspective view showing the external appearance of an electronic camera to which an image-forming optical system according to the present invention is applied, as viewed from the front side thereof.
Figure 12:
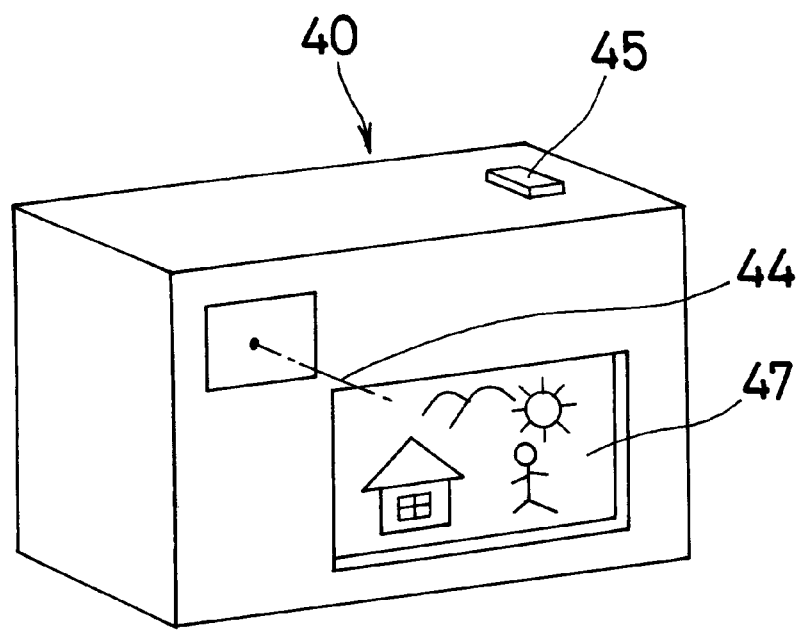
FIG. 12 is a perspective view of the electronic camera shown in FIG. 11, as viewed from the rear side thereof.
Figure 13:
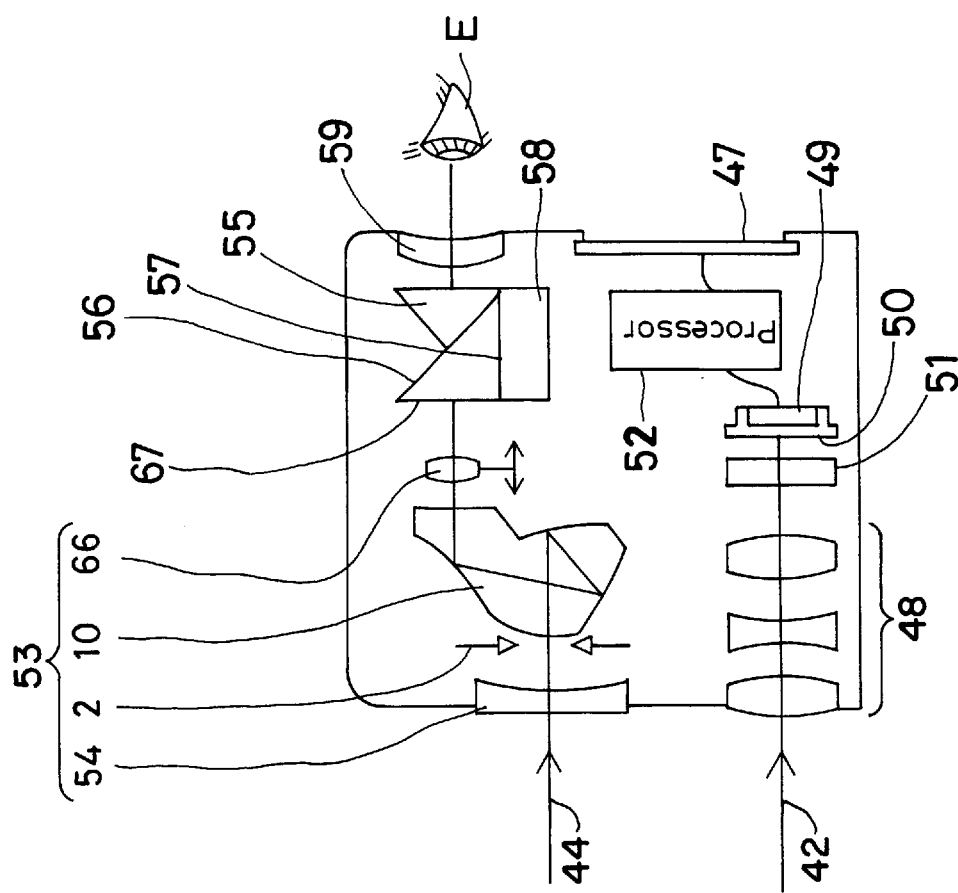
FIG. 13 is a sectional view showing the arrangement of the electronic camera in FIG. 11.

FIGS. 11 to 13 are conceptual views showing an arrangement in which the image-forming optical system according to the present invention is incorporated into an objective optical system in a finder unit of an electronic camera. FIG. 11 is a perspective view showing the external appearance of an electronic camera 40 as viewed from the front side thereof. FIG. 12 is a perspective view of the electronic camera 40 as viewed from the rear side thereof. FIG. 13 is a sectional view showing the arrangement of the electronic camera 40. In the illustrated example, the electronic camera 40 includes a photographic optical system 41 having an optical path 42 for photography, a finder optical system 43 having an optical path 44 for the finder, a shutter 45, a flash 46, a liquid crystal display monitor 47, etc. When the shutter 45, which is placed on the top of the camera 40, is depressed, photography is performed through an objective optical system 48 for photography. An object image produced by the objective optical system 48 for photography is formed on an image pickup surface 50 of a CCD 49 through a filter 51, e.g. a low-pass filter, an infrared cutoff filter, etc. The object image received by the CCD 49 is processed in a processor 52 and displayed as an electronic image on the liquid crystal display monitor 47, which is provided on the rear of the camera 40. The processor 52 is provided with a memory or the like to enable the photographed electronic image to be recorded. It should be noted that the memory may be provided separately from the processor 52. The arrangement may also be such that the photographed electronic image is electronically recorded or written on a floppy disk or the like. The camera 40 may be arranged in the form of a silver halide camera in which a silver halide film is disposed in place of the CCD 49.

Furthermore, an objective optical system 53 for the finder is placed in the optical path 44 for the finder. The objective optical system 53 for the finder comprises a cover lens 54, a stop 2, a prism 10 and a focusing lens 66. The stop 2 and the prism 10 constitute an image-forming optical system. A prism optical system arranged as shown in part (c) of FIG. 17 is used as the image-forming optical system. The cover lens 54 used as a cover member is a lens having a negative power to enlarge the field angle. The focusing lens 66, which is placed behind the prism 10, can be moved in the forward and backward directions along the optical axis to adjust the position thereof. The focusing lens 66 is used for focusing the objective optical system 53 for the finder. An object image produced on an image-formation plane 67 by the objective optical system 53 for the finder is formed on a view frame 57 of a Porro prism 55, which is an image-erecting member. It should be noted that the view frame 57 is placed between a first reflecting surface 56 and second reflecting surface 58 of the Porro prism 55. An ocular optical system 59 is placed behind the Porro prism 55 to lead an erect image to an observer's eyeball E.

In the camera 40, which is arranged as stated above, the objective optical system 53 for the finder can be constructed with a minimal number of optical members. Accordingly, a high-performance and low-cost camera can be realized. In addition, because the optical path of the objective optical system 53 can be folded, the degree of freedom with which the constituent elements can be arranged in the camera increases. This is favorable for design.

Although no mention is made of the arrangement of the objective optical system 48 for photography in the electronic camera 40 shown in FIG. 13, it should be noted that the objective optical system 48 for photography may be formed by using not only a refracting coaxial optical system but also any of the image-forming optical systems, which comprises a single prism 10, according to the present invention.

Figure 14:
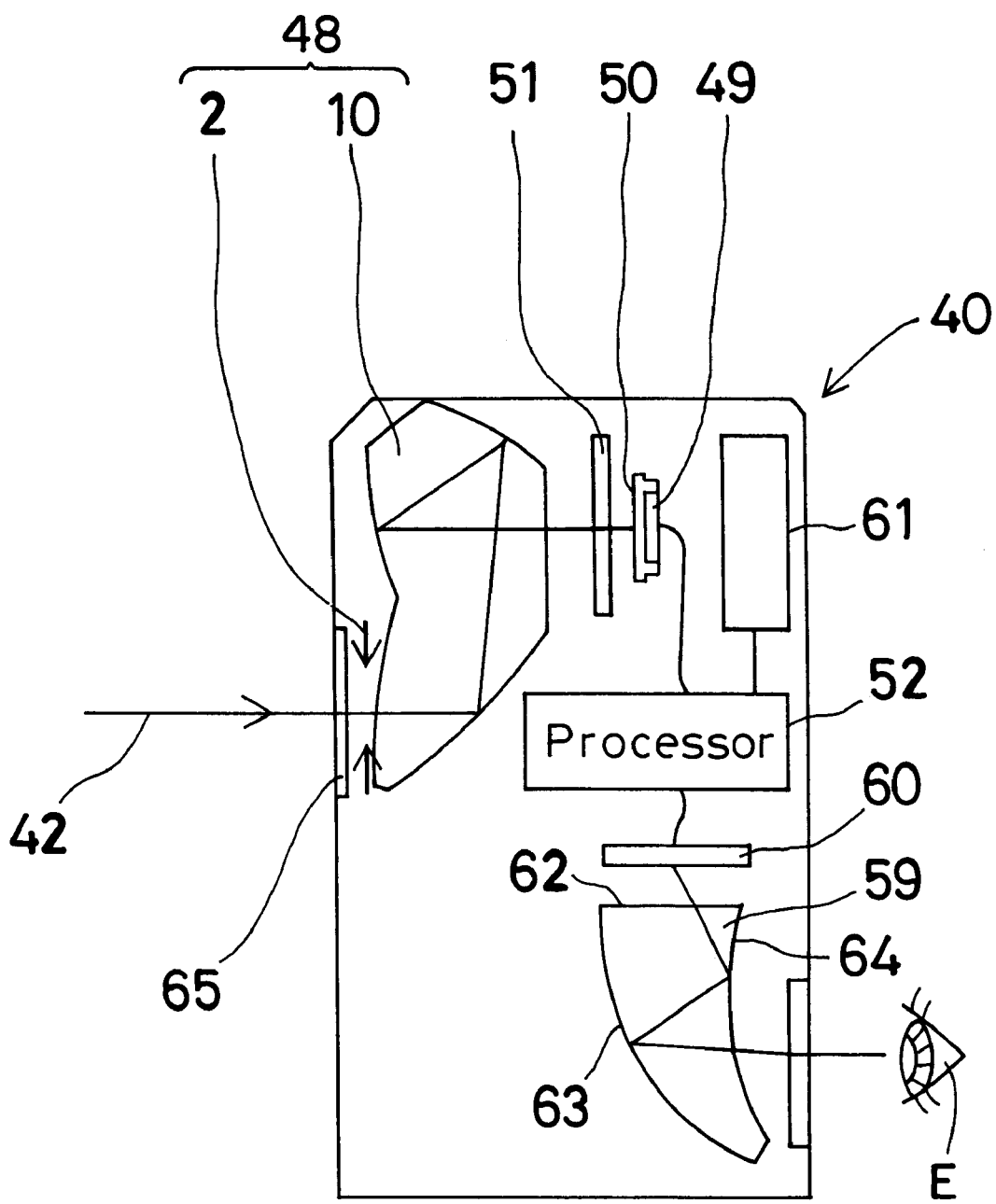
FIG. 14 is a conceptual view of another electronic camera to which an image-forming optical system according to the present invention is applied.

FIG. 14 is a conceptual view showing an arrangement in which an image-forming optical system according to the present invention is incorporated into an objective optical system 48 in a photography part of an electronic camera 40. In this example, a prism optical system arranged as shown in part (a) of FIG. 17 is used in the objective optical system 48 for photography, which is placed in an optical path 42 for photography. An object image produced by the objective optical system 48 for photography is formed on an image pickup surface 50 of a CCD 49 through a filter 51, e.g. a low-pass filter, an infrared cutoff filter, etc. The object image received by the CCD 49 is processed in a processor 52 and displayed in the form of an electronic image on a liquid crystal display device (LCD) 60. The processor 52 also controls a recording device 61 for recording the object image detected by the CCD 49 in the form of electronic information. The image displayed on the LCD 60 is led to an observer's eyeball E through an ocular optical system 59. The ocular optical system 59 is formed from a decentered prism. In this example, the ocular optical system 59 has three surfaces, i.e. an entrance surface 62, a reflecting surface 63, and a surface 64 serving as both reflecting and refracting surfaces. At least one of the two reflecting surfaces 63 and 64, preferably each of them, is formed from a plane-symmetry free-form surface with only one plane of symmetry that gives a power to a light beam and corrects decentration aberrations. The only one plane of symmetry is formed in approximately the same plane as the only one plane of symmetry of the plane-symmetry free-form surfaces in the prism 10 provided in the objective optical system 48 for photography. The objective optical system 48 for photography may include another lens (positive or negative lens) as a constituent element on the object or image side of the prism 10.

In the camera 40 arranged as stated above, the objective optical system 48 for photography can be constructed with a minimal number of optical members. Accordingly, a high-performance and low-cost camera can be realized. In addition, because all the constituent elements of the optical system can be arranged in the same plane, it is possible to reduce the thickness in a direction perpendicular to the plane in which the constituent elements are arranged.

Although in this example a plane-parallel plate is placed as a cover member 65 of the objective optical system 48 for photography, it is also possible to use a lens having a power as the cover member 65 as in the case of the above-described example.

The surface closest to the object side in the image-forming optical system according to the present invention may be used as a cover member instead of providing a cover member separately. In this example, the entrance surface of the prism 10 is the closest to the object side in the image-forming optical system. In such a case, however, because the entrance surface is decentered with respect to the optical axis, if this surface is placed on the front side of the camera, it gives the illusion that the photographic center of the camera 40 is deviated from the subject when the entrance surface is seen from the subject side (the subject normally feels that photographing is being performed in a direction perpendicular to the entrance surface, as in the case of ordinary cameras). Thus, the entrance surface would give a sense of incongruity. Therefore, in a case where the surface of the image-forming optical system that is closest to the object side is a decentered surface as in this example, it is desirable to provide the cover member 65 (or cover lens 54) from the viewpoint of preventing the subject from feeling incongruous when seeing the entrance surface, and allowing the subject to be photographed with the same feeling as in the case of the existing cameras.

Figure 15A:
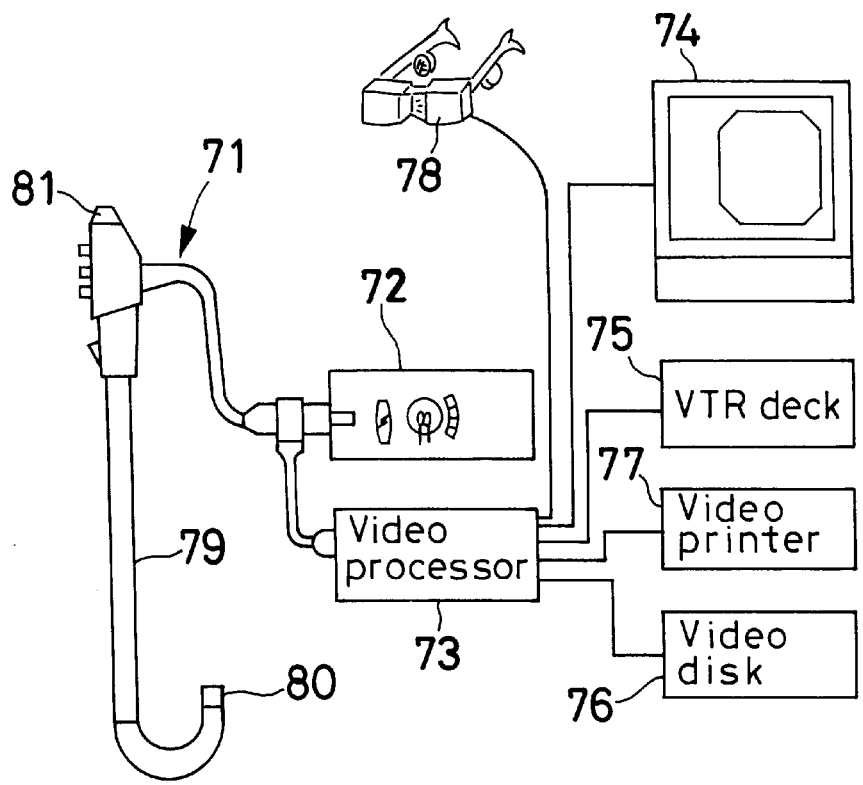
FIGS. 15(*a* & *b*) is a conceptual view of a video endoscope system to which an image-forming optical system according to the present invention is applied.
Figure 15B:
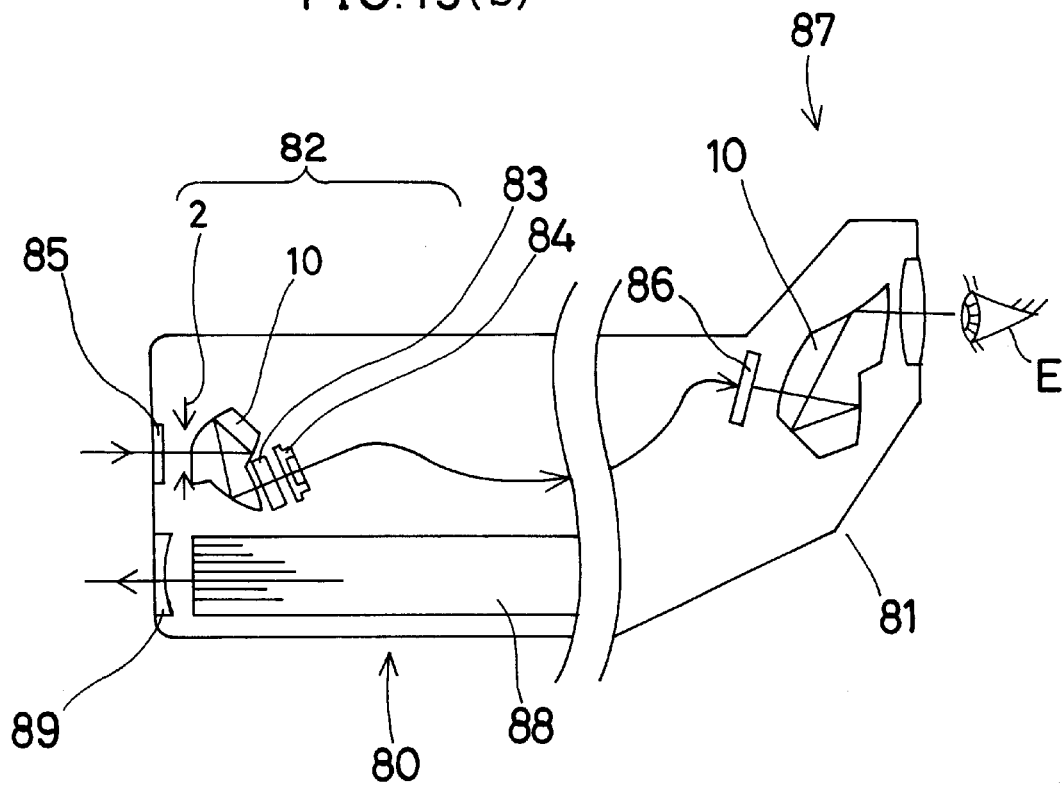
Figure 17A:
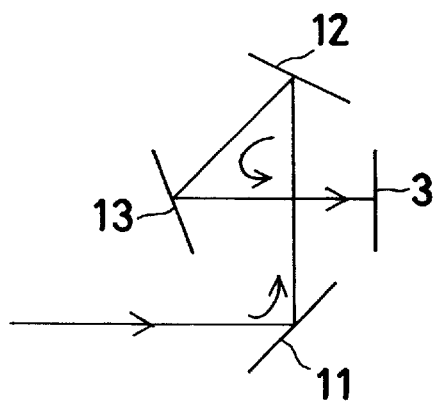
FIGS. 17(*a–d*) is a diagram showing classifications of layouts adoptable in the image-forming optical system according to the present invention to arrange each optical surface thereof.
Figure 17B:
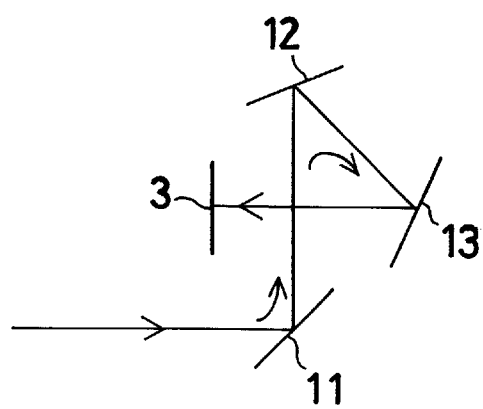
Figure 17C:
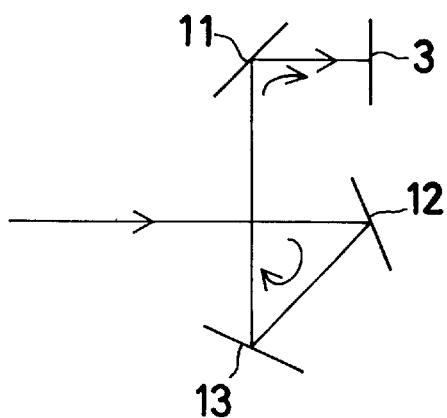
Figure 17D:
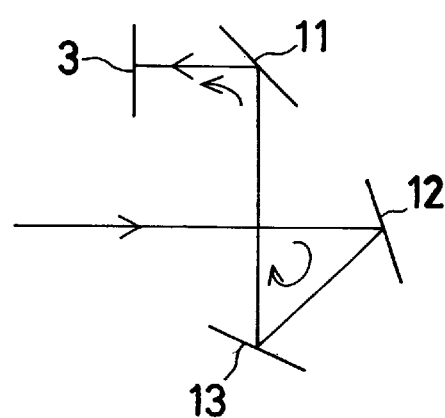
Figure 18:
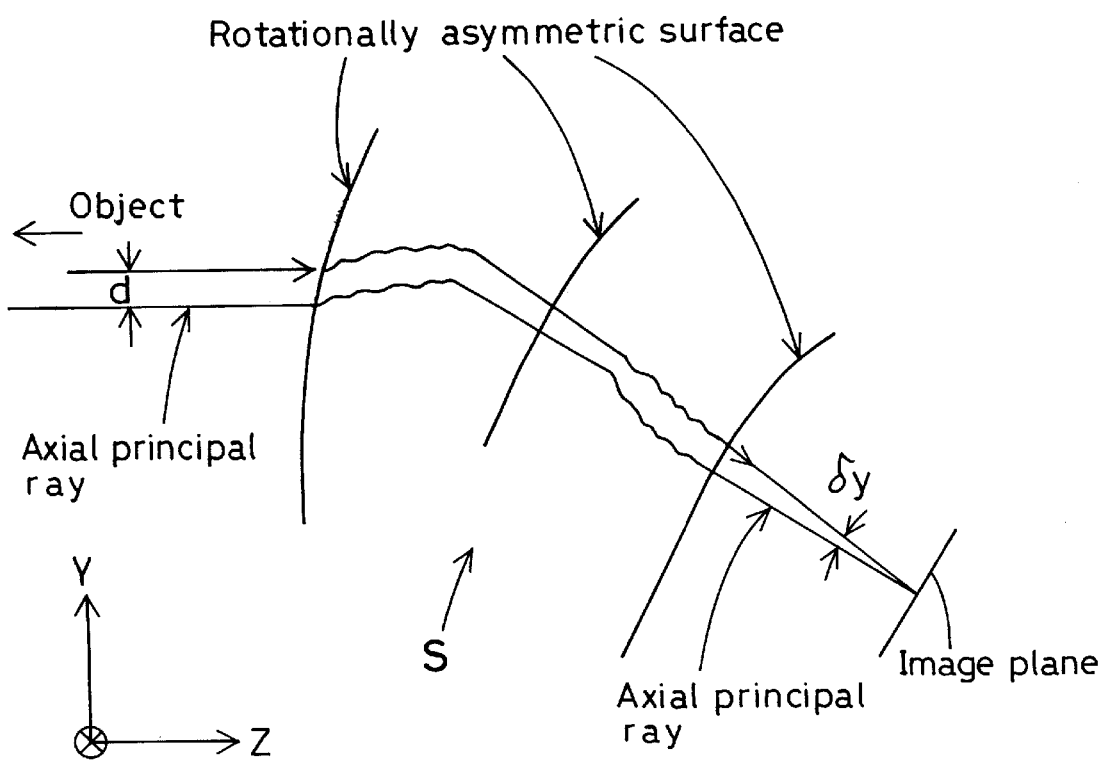
FIG. 18 is a diagram for describing the definition of the power of a decentered optical system and the power of a decentered optical surface.

FIG. 15 is a conceptual view showing an arrangement in which the image-forming optical system according to the present invention is incorporated into an objective optical system 82 in an observation system of a video endoscope system, and the image-forming optical system according to the present invention is also incorporated into an ocular optical system 87 in the observation system of the video endoscope system. In this example, the objective optical system 82 in the observation system uses a prism optical system arranged as shown in part (c) of FIG. 17, and the ocular optical system 87 uses a prism optical system arranged as shown in part (a) of FIG. 17. As shown in part (a) of FIG. 15, the video endoscope system includes a video endoscope 71, a light source unit 72 for supplying illuminating light, a video processor 73 for executing processing of signals associated with the video endoscope 71, a monitor 74 for displaying video signals output from the video processor 73, a VTR deck 75 and a video disk 76, which are connected to the video processor 73 to record video signals and so forth, and a video printer 77 for printing out video signals in the form of images. The video endoscope system further includes a head-mounted image display apparatus (HMD) 78. The video endoscope 71 has an insert part 79 with a distal end portion 80 and an eyepiece part 81. The distal end portion 80 and the eyepiece part 81 are arranged as shown in part (b) of FIG. 15. A light beam from the light source unit 72 passes through a light guide fiber bundle 88 and illuminates a part to be observed through an objective optical system 89 for illumination. Light from the part to be observed enters an objective optical system 82 for observation through a cover member 85. Thus, an object image is formed by the objective optical system 82. The object image is formed on the image pickup surface of a CCD 84 through a filter 83, e.g. a low-pass filter, an infrared cutoff filter, etc. Furthermore, the object image is converted into a video signal by the CCD 84. The video signal is displayed directly on the monitor 74 by the video processor 73, which is shown in part (a) of FIG. 15. In addition, the video signal is recorded in the VTR deck 75 and on the video disk 76 and also printed out in the form of an image from the video printer 77. In addition, the object image is displayed on the image display device of the HMD 78, thereby allowing a person wearing the HMD 78 to observe the displayed image. At the same time, the video signal converted by the CCD 84 is displayed in the form of an electronic image on a liquid crystal display device (LCD) 86 in the eyepiece part 81. The displayed image is led to an observer's eyeball E through the ocular optical system 87, which is formed from the image-forming optical system according to the present invention.

The endoscope arranged as stated above can be constructed with a minimal number of optical members. Accordingly, a high-performance and low-cost endoscope can be realized. Moreover, because the constituent elements of the objective optical system 82 are arranged in series in the direction of the longitudinal axis of the endoscope, the above-described advantageous effects can be obtained without hindering the achievement of a reduction in the diameter of the endoscope.

Incidentally, the image-forming optical system can also be used as a projection optical system by reversing the optical path. FIG. 16 is a conceptual view showing an arrangement in which a prism optical system according to the present invention is used in a projection optical system 96 of a presentation system formed by combining together a personal computer 90 and a liquid crystal projector 91. In this example, a prism optical system arranged in the same way as in part (a) of FIG. 17 except that the optical path is reverse to that in part (a) of FIG. 17 is used in the projection optical system 96. Referring to FIG. 16, image and manuscript data prepared on the personal computer 90 is branched from a monitor output and delivered to a processing control unit 98 in the liquid crystal projector 91. In the processing control unit 98 of the liquid crystal projector 91, the input data is processed and output to a liquid crystal panel (LCP) 93. The liquid crystal panel 93 displays an image corresponding to the input image data. Light from a light source 92 is applied to the liquid crystal panel 93. The amount of light transmitted by the liquid crystal panel 93 is determined by the gradation of the image displayed on the liquid crystal panel 93. Light from the liquid crystal panel 93 is projected on a screen 97 through a projection optical system 96 comprising a field lens 95 placed immediately in front of the liquid crystal panel 93, a prism 10 constituting the image-forming optical system according to the present invention, and a cover lens 94 which is a positive-lens.

The projector arranged as stated above can be constructed with a minimal number of optical members. Accordingly, a high-performance and low-cost projector can be realized. In addition, the projector can be constructed in a compact form.

Figure 19:
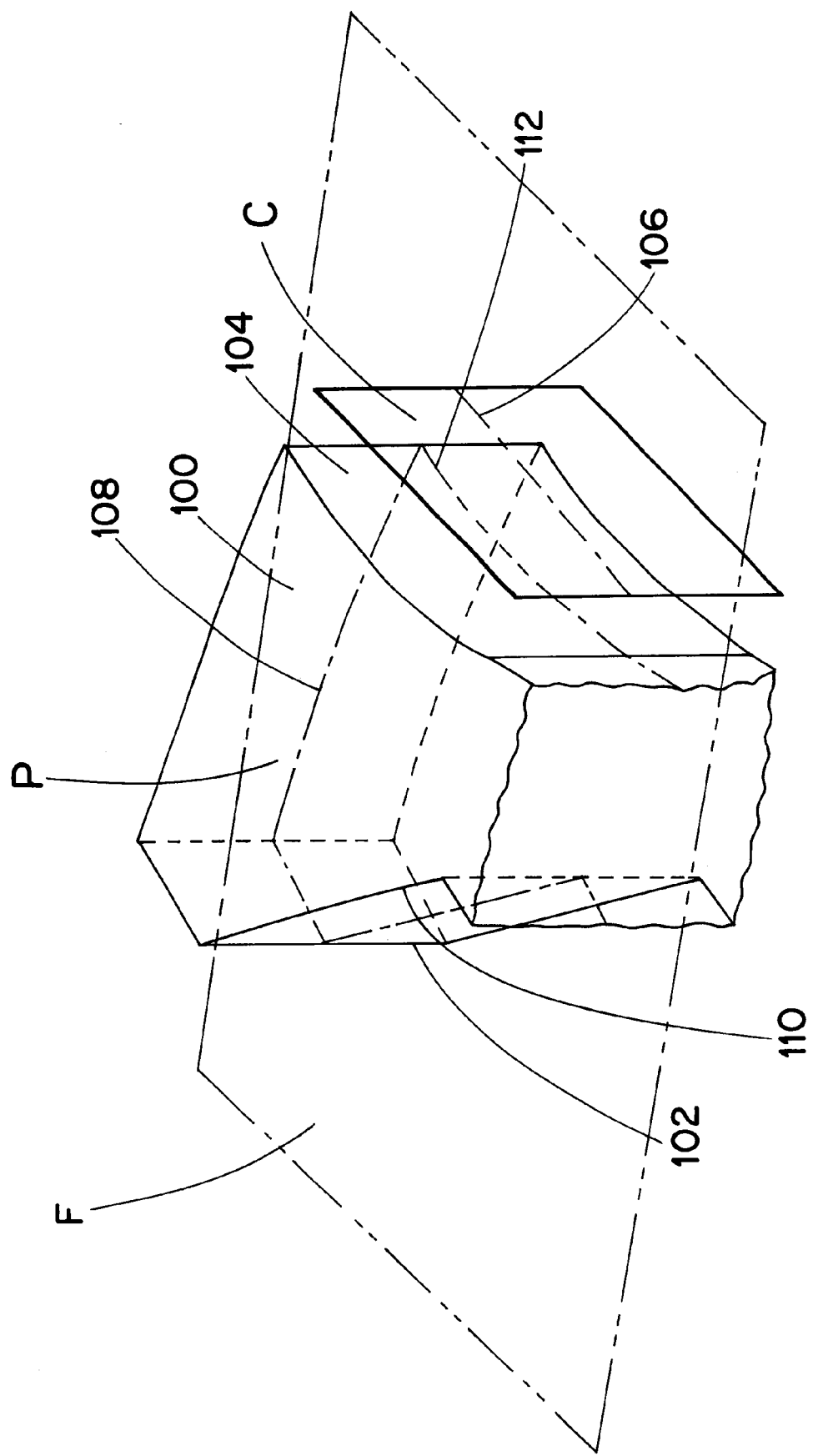
FIG. 19 is a diagram showing a desirable arrangement for an image-forming optical system according to the present invention when it is placed in front of an image pickup device.

FIG. 19 is a diagram showing a desirable arrangement for the image-forming optical system according to the present invention when the image-forming optical system is placed in front of an image pickup device, e.g. a CCD, or a filter. In the figure, a decentered prism P is a prism member in the image-forming optical system according to the present invention. When the image pickup surface C of an image pickup device forms a quadrangle as shown in the figure, it is desirable from the viewpoint of forming a beautiful image to place the decentered prism P so that the plane F of symmetry of a plane-symmetry free-form surface provided in the decentered prism P is parallel to at least one of the sides forming the quadrangular image pickup surface C.

When the image pickup surface C has a shape in which each of the four interior angles is approximately 90 degrees, such as a square or a rectangle, it is desirable that the plane F of symmetry of the plane-symmetry free-form surface should be parallel to two sides of the image pickup surface C that are parallel to each other. It is more desirable that the plane F of symmetry should lie at the middle between two parallel sides and coincide with a position where the image pickup surface C is in a symmetry between the right and left halves or between the upper and lower halves. The described arrangement enables the required assembly accuracy to be readily obtained when the image-forming optical system is incorporated into an apparatus, and is useful for mass-production.

When a plurality or all of the optical surfaces constituting the decentered prism P, i.e. the first transmitting surface, the first reflecting surface, the second reflecting surface 100, the third reflecting surface 102, and the second transmitting surface 104, are plane-symmetry free-form surfaces, it is desirable from the viewpoint of design and aberration correcting performance to arrange the decentered prism P so that the planes of symmetry of the plurality or all of the optical surfaces are in the same plane F. (In FIG. 19, the central horizontal plane of the image pickup surface C is labeled 106, the only one plane of symmetry of the second reflecting surface 100 is 108, the only one plane of symmetry of the third reflecting surface 102 is 110 and the only one plane of symmetry of the second transmitting surface 104 is labeled 112.) In addition, it is desirable that the plane F of symmetry and the image pickup surface C should be in the above-described relationship.

As will be clear from the foregoing description, the present invention makes it possible to obtain an image-forming optical system including a compact and high-performance prism optical system favorably corrected for aberrations due to decentration by appropriately using rotationally asymmetric surfaces.

What we claim is:

1. An image-forming optical system having a positive refracting power as a whole for forming an object image, said image-forming optical system comprising:
   a prism member formed from a medium having a refractive index (n) larger than 1 (n>1),
   wherein said prism member is a single cemented or integrally molded prism, said prism having:
      a first transmitting surface through which a light beam enters said prism;
      first, second and third reflecting surfaces that reflect the light beam in said prism; and
      a second transmitting surface through which the light beam exits from said prism,
   wherein said second reflecting surface and said third reflecting surface are arranged so that when an axial principal ray is projected onto a plane defined by the axial principal ray incident on said second reflecting surface and the axial principal ray reflected from said second reflecting surface, a path of the axial principal ray in said prism is folded in a triangular shape, and the axial principal ray incident on said second reflecting surface and the axial principal ray reflected from said third reflecting surface form intersecting optical paths,
   wherein at least one of said first, second and third reflecting surfaces has a curved surface configuration that gives a power to a light beam, said curved surface configuration having a rotationally asymmetric surface configuration that corrects aberrations due to decentration, and
   wherein said prism member has, in order in which light passes from an object side thereof, the first transmitting surface, the second reflecting surface, the third reflecting surface, the first reflecting surface, and the second transmitting surface so as to form an optical path in order mentioned.

2. An image-forming optical system according to claim 1, wherein the intersecting optical paths formed by said second reflecting surface and said third reflecting surface form a grade crossing where a plane defined by the axial principal ray incident on said third reflecting surface and the axial principal ray reflected from said third reflecting surface coincides with a plane defined by the axial principal ray incident on said second reflecting surface and the axial principal ray reflected from said second reflecting surface.

3. An image-forming optical system according to claim 1, wherein said prism member has, in order in which light passes from an object side thereof, the first transmitting surface, the first reflecting surface, the second reflecting surface, the third reflecting surface, and the second transmitting surface so as to form an optical path in order mentioned.

4. An image-forming optical system according to claim 3, wherein said second reflecting surface is placed so that a light beam reflected from said second reflecting surface travels toward the object side, and an image-formation plane is formed at a position opposite to the object side across said prism member.

5. An image-forming optical system according to claim 3, wherein said second reflecting surface is placed so that a light beam reflected from said second reflecting surface travels away from the object side, and an image-formation plane is formed on the object side of said prism member.

6. An image-forming optical system according to claim 3, wherein said prism member is so arranged that a direction of turn of a light beam along a triangular optical path formed by said second reflecting surface and said third reflecting surface is identical with a direction of turn of a light beam along an optical path incident on and reflected from said first reflecting surface.

7. An image-forming optical system according to claim 3, wherein said prism member is so arranged that a direction of turn of a light beam along a triangular optical path formed by said second reflecting surface and said third reflecting surface is opposite to a direction of turn of a light beam along an optical path incident on and reflected from said first reflecting surface.

8. An image-forming optical system according to claim 1, wherein said first reflecting surface is placed so that a light beam reflected from said first reflecting surface travels away from the object side, and an image-formation plane is formed at a position opposite to the object side across said prism member.

9. An image-forming optical system according to claim 1, wherein said first reflecting surface is placed so that a light beam reflected from said first reflecting surface travels toward the object side, and an image-formation plane is formed on the object side of said prism member.

10. An image-forming optical system according to claim 1, wherein said first reflecting surface and said second transmitting surface are an identical surface.

11. An image-forming optical system according to claim 10, wherein said identical surface is arranged to have both reflecting and transmitting actions by forming said first reflecting surface as a totally reflecting surface.

12. An image-forming optical system according to claim 1, wherein both said second reflecting surface and said third reflecting surface have a rotationally asymmetric surface configuration that gives a power to a light beam and corrects aberrations due to decentration.

13. An image-forming optical system according to claim 1, wherein both said first reflecting surface and said second reflecting surface have a rotationally asymmetric surface configuration that gives a power to a light beam and corrects aberrations due to decentration.

14. An image-forming optical system according to claim 1, wherein both said first reflecting surface and said third reflecting surface have a rotationally asymmetric surface configuration that gives a power to a light beam and corrects aberrations due to decentration.

15. An image-forming optical system according to claim 1, wherein said first transmitting surface has a rotationally asymmetric surface configuration that gives a power to a light beam and corrects aberrations due to decentration.

16. An image-forming optical system according to claim 1, wherein said second transmitting surface has a rotationally asymmetric surface configuration that gives a power to a light beam and corrects aberrations due to decentration.

17. An image-forming optical system according to claim 1, wherein said second transmitting surface is a plane surface.

18. An image-forming optical system according to claim 1, wherein an entrance pupil of said image-forming optical system is formed between said prism member and an object.

19. An image-forming optical system according to claim 1, wherein said rotationally asymmetric surface configuration is a plane-symmetry free-form surface configuration having only one plane of symmetry.

20. An image-forming optical system according to any one of claims 2 to 19, wherein at least one of said second reflecting surface and said third reflecting surface satisfies the following condition:

$$5° < \theta < 50° \quad (1)$$

where θ is an angle of incidence of the axial principal ray on said second reflecting surface and said third reflecting surface.

21. An image-forming optical system according to claim 20, wherein both said second reflecting surface and said third reflecting surface satisfy the following condition:

$$5° < \theta < 50° \quad (2).$$

22. A finder optical system comprising:

said image-forming optical system according to any one of claims 2 to 19, said image-forming optical system being provided as a finder objective optical system;

an image-inverting optical system for erecting an object image formed by said finder objective optical system; and an ocular optical system.

23. A camera apparatus comprising:

said finder optical system according to claim 22; and an objective optical system for photography provided in parallel to said finder optical system.

24. An image pickup optical system comprising:

said image-forming optical system according to any one of claims 2 to 19; and an image pickup device placed in an image plane formed by said image-forming optical system.

25. A camera apparatus comprising:

said image-forming optical system according to any one of claims 2 to 19, said image-forming optical system being provided as an objective optical system for photography; and a finder optical system placed in one of an optical path separate from an optical path of said objective optical system for photography and an optical path split from the optical path of said objective optical system for photography.

26. An electronic camera apparatus comprising:

said image-forming optical system according to any one of claims 2 to 19;

an image pickup device placed in an image plane formed by said image-forming optical system;

a recording medium for recording image information received by said image pickup device; and an image display device that receives image information from one of said recording medium and said image pickup device to form an image for observation.

27. An endoscope system comprising:

an observation system having said image-forming optical system according to any one of claims 2 to 19 and an image transmitting member for transmitting an image formed by said image-forming optical system along a longitudinal axis; and an illumination system having an illuminating light source and an illuminating light transmitting member for transmitting illuminating light from said illuminating light source along said longitudinal axis.

* * * * *